(12) United States Patent
Schechter

(10) Patent No.: US 7,958,872 B1
(45) Date of Patent: Jun. 14, 2011

(54) AIRLESS ENGINE WITH GAS AND WATER RECYCLING

(76) Inventor: Michael Moses Schechter, Farmington Hills, MI (US)

( * ) Notice: Subject to any disclaimer, the term of this patent is extended or adjusted under 35 U.S.C. 154(b) by 21 days.

(21) Appl. No.: 12/653,957

(22) Filed: Dec. 22, 2009

(51) Int. Cl.
*F02M 25/07* (2006.01)
*F02B 47/10* (2006.01)
*F02B 47/02* (2006.01)

(52) U.S. Cl. .................... 123/568.11; 123/585
(58) Field of Classification Search .......... 123/585–588, 123/568.11, 568.12
See application file for complete search history.

(56) References Cited

U.S. PATENT DOCUMENTS

| | | | |
|---|---|---|---|
| 3,608,529 A * | 9/1971 | Smith et al. ................. | 123/25 C |
| 3,618,576 A * | 11/1971 | Dixon ............................ | 60/279 |
| 3,672,341 A * | 6/1972 | Smith et al. .................... | 123/536 |
| 3,696,795 A * | 10/1972 | Smith et al. .................... | 123/1 A |
| 3,861,367 A * | 1/1975 | Kelmar .......................... | 123/567 |
| 3,983,882 A * | 10/1976 | Billings ......................... | 123/1 A |
| 4,064,840 A * | 12/1977 | Vierling ..................... | 123/568.12 |
| 5,400,746 A * | 3/1995 | Susa et al. ..................... | 123/585 |
| 5,649,517 A | 7/1997 | Poola et al. | |
| 5,960,777 A | 10/1999 | Nemser et al. | |
| 6,055,808 A | 5/2000 | Poola et al. | |
| 6,067,973 A | 5/2000 | Chanda et al. | |
| 6,352,068 B1 | 3/2002 | Jacobsen | |
| 6,397,807 B1 | 6/2002 | Suzuki | |
| 7,513,222 B2 | 4/2009 | Orlosky | |
| 7,543,577 B2 * | 6/2009 | Ha et al. ........................ | 123/585 |
| 2006/0037591 A1 * | 2/2006 | Ferguson ..................... | 123/567 |
| 2007/0251235 A1 * | 11/2007 | Schmid et al. ................ | 123/585 |

* cited by examiner

*Primary Examiner* — Hieu T Vo
*Assistant Examiner* — Arnold Castro

(57) ABSTRACT

An internal-combustion engine receives no air from outside atmosphere. Instead, combustion gas expelled from the engine is cooled and recycled back into the engine. That gas contains no nitrogen and consists mostly of carbon dioxide and water vapor. Oxygen and fuel are added to the recycled gas, and the resulting mixture is used to perform an internal-combustion cycle. Cooling that gas condenses its water vapor, and liquid water is separated from the gas. That water is used for injection into the recycled gas at a later time. A small amount of the expelled combustion gas is discharged into outside environment, and the rest is recycled. Water too is recycled back into the engine, and whatever is lost to outside environment is replaced by reclaiming water produced in combustion. No additional supply of water is needed. Since no nitrogen is present, no nitrogen oxides are produced. The amount of other harmful exhaust emissions is greatly reduced too, since most of them are recycled back into the engine. Water evaporation in the cylinders greatly improves fuel economy. The engine is inherently supercharged with combustion-gas pressure, and no turbocharger is needed. Since the combustion gas is heavier than air, the engine can be substantially smaller than a conventional engine of equal power. A smaller engine has less friction.

20 Claims, 13 Drawing Sheets

AIRLESS ENGINE WITH GAS AND WATER RECYCLING

BACKGROUND OF THE INVENTION

Combustion of hydrocarbon fuels in internal-combustion engines is a major contributor to an increase in carbon dioxide content in Earth atmosphere, which according to prevailing scientific consensus contributes to global warming. It is also responsible for the ever increasing import of foreign oil, which adversely affects the national trade balance account. It is therefore imperative to achieve a substantial reduction in the amount of fuel consumed by internal-combustion engines on a national scale.

Another deficiency of the internal combustion engines is in that they are prodigious producers of nitrogen oxides, unburned hydrocarbons and other air pollutants that are very harmful to human health. Efforts to control emission of those pollutants are very complex and expensive, and the results of those efforts to date are insufficient to assure clean air environment, especially in large cities.

In view of the above, it is clear that it is highly desirable to have a system and a method of internal-combustion engine operation that offers a substantial reduction in engine fuel consumption coupled with a complete or nearly-complete elimination of harmful air pollutants. Such a system and a method are the subject of the present invention.

PRIOR ART

Recycling some of the engine exhaust gas back into the engine intake is not new. Many modern internal-combustion engines incorporate an exhaust gas recirculation (EGR) system that provides for adding a small amount of exhaust gas (10-15%, in most cases) to the engine intake air. This reduces the peak combustion temperature that contributes to formation of nitrogen oxides in the combustion chamber. EGR cannot eliminate the nitrogen oxide emission, but it can reduce it.

The method of the present invention does not involve adding exhaust gas to the intake air. The engine of the present invention inducts no air from outside atmosphere. Instead, combustion gas is recycled from the engine outlet back into the engine inlet and, when oxygen is added to it, forms a kind of "artificial air" that contains no nitrogen. That "artificial air" is used instead of atmospheric air to burn fuel in the engine. Since there is no nitrogen, no nitrogen oxides can form, regardless of the temperature. The engine of the present invention has zero nitrogen oxides emission.

Adding oxygen to the engine intake is also known. A U.S. Pat. No. 7,543,577 to Ha, et al describes a system, in which an internal-combustion engine is supplied with a mixture of oxygen and fuel. The system inducts atmospheric air and runs it through a PSA (pressure swing adsorption) system, where most of the nitrogen is removed and exhausted into outside environment. The remaining gas, which contains about 95% oxygen and 5% nitrogen, is mixed with fuel and fed into the engine combustion chamber. An option to induct atmospheric air and add it to the mixture is also provided. There is no recycling of combustion gas.

Operating an engine with a mixture of fuel and oxygen presents some technical difficulties. In a conventional internal-combustion engine, fuel is mixed with air containing 23% of oxygen (by weight), which takes part in combustion, and 77% of nitrogen and argon, which does not take part in combustion. Presence of a substantial amount of inert gas (nitrogen) is important, because it maintains the temperature in the combustion chamber within an acceptable level.

When fuel is burned in air, the chemically correct ratio of air to fuel is about 14.8:1, and the oxygen-to-fuel ratio is about 3.4:1. The peak combustion temperature may reach 2200 degrees Celsius, which is almost 4000 degrees Fahrenheit. The above patent does not specify what oxygen-to-fuel ratio is used, but using the chemically correct ratio (3.4:1) is out of the question, because the mass of gas would be almost four times less than it is in the case when air is used, but the amount of heat is still the same. As a result, the temperature (and the pressure) would be several times higher and would reach levels that are completely unacceptable from the point of view of the engine integrity and durability.

To maintain an acceptable level of temperature in the engine of the above patent, the oxygen-to-fuel ratio would have to be much higher than the chemically correct ratio (3.4:1). In fact, it would have to be close to the value of the air-to-fuel ratio in a conventional engine (14.8:1). The extra oxygen would serve as inert gas that absorbs the heat, and the exhaust gas will contain large amount of unused oxygen. The main disadvantage of this is that, to produce the needed amount of oxygen, the system of the above patent must handle more than four times greater amount of air than does a conventional engine that uses air directly for combustion.

Ha, et al must be fully aware of the above difficulties, since the above patent also includes means "for supplying external air to the engine when the oxygen is insufficient in the process of combustion". When atmospheric air is added to the oxygen flowing into the combustion chamber, the engine of the above patent turns into an engine running on oxygen-enriched air, like in some of the patents referred to below.

Ha, et al expect the engine of the above patent to produce less nitrogen oxides, because less nitrogen (about 5%) is available to react with oxygen. However, for the tiny amount of nitrogen oxides that form during combustion, even 5% provides a rich supply of nitrogen, if sufficient supply of oxygen is available. It is an open question if abundance of oxygen molecules chasing a scarcity of nitrogen molecules, as in the above patent, is better than an abundance of nitrogen molecules chasing a scarcity of oxygen molecules, as in a conventional engine. Regardless of the answer to that question, the system of the above patent does not eliminate the nitrogen oxide emission, because it does not eliminate nitrogen.

Ha, et al also expect carbon monoxide and unburned hydrocarbon emissions to be reduced due to abundance of oxygen in the engine of the above patent. Without question, carbon monoxide will be reduced. Reduction in unburned hydrocarbons is possible, but it is more questionable. Unburned hydrocarbons form in small crevices between the piston and the cylinder, where the flame cannot penetrate. If there is no flame, hydrocarbons don't burn, regardless of how much oxygen is available.

In contrast to the above patent, the system of the present invention does not have to induct a huge amount of air and exhaust a huge amount of nitrogen to produce a sufficient amount of oxygen for burning the fuel and for serving as an inert diluting gas. Nor does it have to add atmospheric air to serve as diluting gas. The engine of the present invention receives no air from outside atmosphere. Instead, combustion gas expelled from the engine is cooled and repeatedly recycled back into the engine. That gas contains no nitrogen and consists mostly of carbon dioxide and water vapor. Oxygen and fuel are added to the recycled gas, and the resulting mixture is used to perform an internal-combustion cycle. Only a small amount of the expelled combustion gas is discharged into outside environment, and the rest is recycled again. Since no nitrogen is present, no nitrogen oxides are produced. The engine of the present invention is a true zero nitrogen oxides emission engine.

In the engine of the present invention, the amount of other harmful exhaust emissions, including particulate matter, unburned hydrocarbons and carbon monoxide, is greatly reduced, but the reason for this has very little to do with the relative abundance or scarcity of oxygen in the combustion chamber. The key to reduction in those emissions is in repeatedly subjecting the same gas to the fires of combustion in the engine. Since most of the combustion gas is recycled back into the engine cylinders over-and-over again, an average particle of gas goes through the combustion process many times before it is discharged into outside environment. It is not likely that a particle of unburned hydrocarbon that formed in a small crevice, where the flame could not penetrate, would find itself in such crevice again when it visits the combustion chamber again. In such operation, whatever did not burn the first time is repeatedly returned to the combustion chamber and is burned there.

In a U.S. Pat. No. 6,397,807 to Suzuki, oxygen is added to the intake air for a different reason. The above patent addresses the difficulties with the cold start of internal combustion engine. The system of the above patent includes a separate combustion heater, in which fuel can be burned separately from the engine. Hot combustion gas, produced in the heater, flows into the engine intake system, where it is added to the intake air. This takes place at the engine starting time or before the engine starting time, when the engine does not even rotate. The temperature of the intake air is raised by the high temperature of the combustion gas from the heater, thereby speeding up the warm-up of the engine. The heater also heats up the engine cooling water.

In the engine of the above patent, addition of combustion gas from the heater to the engine intake air reduces the amount of oxygen available for combustion in the engine during the start-up. To compensate for oxygen deficiency, oxygen is added from an oxygen supply apparatus to the intake air or to the combustion gas. After the engine warms up, regular operation with atmospheric air resumes. The above patent claims only improvements in engine cold-start capability.

A number of other patents claim a reduction in nitrogen oxides emission and some other advantages by producing and feeding into the engine oxygen-enriched or nitrogen-reduced air. Such are:

U.S. Pat. No. 6,352,068 to Jacobson.
U.S. Pat. No. 6,067,973 to Chanda, et al.
U.S. Pat. No. 6,055,808 to Poola, et al.
U.S. Pat. No. 5,960,777 to Nemser, et al.
U.S. Pat. No. 5,649,517 to Poola, et al.

None of the above patents claims complete elimination of nitrogen oxides, since none of them achieves complete elimination of nitrogen from the engine, as the present invention does.

Benefits of water injection into the cylinders of an internal-combustion engine are known too. It is, however, the concept of gas and water recycling, incorporated in the present invention that makes application of the in-cylinder water injection a practical possibility for light engines used in transportation industry.

It is generally recognized that presence of liquid water in the engine cylinder, during gas compression reduces the required compression work, and that presence of liquid water, during gas compression, increases the expansion work. Both actions lead to a substantial improvement in engine fuel efficiency. It is, however, a fact that water injection into the engine cylinders did not find broad application in spite of its promise of better fuel economy. That is because most existing internal-combustion engine are used in light transportation vehicles, such as automobiles, where there is no ready access to an outside source of water supply, and all the water needed for engine operation must be carried on-board. The quantity of water needed to achieve a meaningful improvement in fuel economy is very substantial—it is much greater than the quantity of fuel consumed by the engine. Therefore an automobile with an engine using water injection would have to carry a very large tank with water. Most vehicle designers are not willing to accept such deficiency in weight and packaging.

In principle, it is possible to condense water vapor contained in the engine exhaust gas and used that water for water injection. Unfortunately, the quantity of water that can be extracted from the exhaust gas of a conventional engine that uses air for its operation is too small to achieve a meaningful improvement in fuel economy. That is especially true for compression-ignition engines that operate using a broad range of air-to-fuel ratios. In a compression-ignition engine operating at full-load with an air-to-fuel ratio of 20:1, exhaust gas contains about 6% of water vapor. At light-load with 80:1 air-to-fuel ratio, exhaust gas contains only about 1.5% of water vapor. These are very small numbers that do not justify the cost of a water vapor condensing system.

Thanks to gas and water recycling, the engine of the present invention offers much more favorable conditions for application of in-cylinder water injection than a conventional engine does. The composition of gas inducted into the engine of the present invention is very different from that inducted into a conventional engine. A conventional engine inducts atmospheric air, in which nitrogen is the main ingredient, and nitrogen remains the main component of its exhaust gas. In contrast to that, the engine of the present invention inducts recycled combustion gas, in which nitrogen is replaced by carbon dioxide and water vapor. That gas contains about 29% of water vapor. That is a sufficient amount of water vapor to justify condensing it and injecting liquid water into the recycled gas at a later time. Later, most of that water flows back into the engine as a water vapor fraction of the recycled gas. Whatever is lost to outside environment is replaced by water produced in combustion. Thus the engine can use large amount of water, with most of that water being continuously recycled.

Thanks to water recycling, the engine of the present invention is self-sufficient in terms of it water consumption. No additional supply of water is needed, regardless of how much water is used in each engine cycle, and there is no need for an on-board tank with water.

A U.S. Pat. No. 7,513,222 to Orlosky describes an engine system that includes a water reservoir and an additive reservoir. Water from the water reservoir is injected into the engine cylinder, at the end of combustion, and turns into steam that performs additional work. There is no water injection during air compression. An additive from the additive reservoir is added to the water that is injected into the cylinder. That additive controls the harmful pollutants produced during combustion.

The engine of the above patent inducts air, and hence its exhaust is expelled into outside environment. This also expels whatever water vapor is contained in the exhaust gas. Therefore, the water reservoir must be regularly refilled with additional water to replace the water that was used up in the in-cylinder injection. This is a heavy burden, especially if the engine is installed in a transportation vehicle.

In contrast to that, the engine of the present invention does not need an additional supply of water, since it uses water extracted from the recycled combustion gas. This provides enough water for water injection both during gas compression and during gas expansion.

The engine of the above patent uses an additive added to the injected water to produce less harmful exhaust emissions. It is not clear how effective that method is, since Orlosky does not specify what kind of additive is used, nor does he explain the chemistry that renders the pollutants harmless.

The engine of the present invention uses an entirely different method of pollutants control. Elimination of air induction leads to a complete elimination of nitrogen oxides emission. Other harmful pollutants are substantially eliminated by repeatedly returning them to the combustion chamber, where they are burned.

It should be noticed that the concept of the present invention eliminates the need for turbochargers and superchargers in internal-combustion engines. They are not needed for boosted operation because the engine of the present invention is inherently self-supercharging. Elimination of those expensive means for boosting the engine power is a substantial reduction in cost. None of the engines in the above reviewed patents is capable of self-supercharging.

OBJECTS AND ADVANTAGES

One object of the present invention is to achieve a complete elimination of nitrogen oxides emissions from internal-combustion engines. This is achieved by eliminating nitrogen. Since no atmospheric air is inducted into the engine, the gas that participates in combustion contains no nitrogen. As a result, no nitrogen oxides are produced, and the engine has zero nitrogen oxides emission. This resolves one of the most insidious problems associated with internal combustion engine operation. It also leads to a very substantial reduction in costs, since it eliminates the need for the very expensive systems that are presently used to control nitrogen oxides emissions.

Another object of the present invention is to achieve a near-complete elimination of most harmful pollutants. In the engine of the present invention, the amount of harmful exhaust emissions, including particulate matter, unburned hydrocarbons and carbon monoxide, is greatly reduced. Most of the combustion gas expelled from each engine cylinder, after each cycle, is recycled back into the engine intake. Only a small fraction of that gas is exhausted into the exhaust pipe and, from there, into outside environment. On average, the mass of gas exhausted into the environment is equal to the mass of fuel and oxygen added to the recycled combustion gas. The percentage of combustion gas recycled back into the engine varies from 80%, at full-load, to 95% at light-load. Hence an average particle of combustion gas is recycled through the engine many times before it is exhausted into outside environment.

The recycled combustion gas caries back into the engine all the unburned hydrocarbons, particulate matter and carbon monoxide it contains. The key to reduction in those emissions is in repeatedly subjecting the same gas to the fires of combustion in the engine. Since most of the combustion gas is recycled back into the engine cylinders over-and-over again, an average particle of gas goes through the combustion process many times. In such operation, whatever did not burn the first time is repeatedly returned to the combustion chamber and is burned there. In that way, between 80 and 95% of harmful emissions produced in combustion are eliminated before they reach the engine exhaust pipe. The remaining 5 to 20% of emissions may be treated in a catalyst incorporated in the exhaust pipe. With noble metal catalyst efficiency approaching 90%, as much as 99% of harmful emissions produced in the combustion chambers can be eliminated. Also, a much smaller catalytic converter and much less noble metal are needed. This is a substantial reduction in costs.

A further object of the present invention is to achieve a substantial reduction in fuel consumption. This is achieved by condensing water vapor contained in the recycled combustion gas and adding reclaimed liquid water to that gas for evaporation at selected points in the engine cycle. Evaporation of water during gas-compression stroke absorbs the heat of compression and provides for near-isothermal compression process, which leads to a substantial reduction in the amount of work needed to compress the gas. Water injection into the engine cylinders, during the power stroke, contributes to an increase in the gas-expansion work. Inside the combustion chamber, water converts into steam that expands and performs expansion work that supplements work performed by the combustion gas. Reducing the compression work and increasing the expansion work improves the engine fuel economy.

Yet another object of the present invention is to achieve a very substantial reduction in engine size. The engine of the present invention can be considerably smaller than a conventional air-breathing engine with the same power capacity. This is because carbon dioxide, which is the main ingredient in the recycled combustion gas of the airless engine, is much heavier than nitrogen, which is the main ingredient in the intake air of a conventional air-breathing engine. Therefore, a smaller engine cylinder can receive the same mass of gas as a larger cylinder in a conventional engine using air at the same pressure and temperature. Direct injection of oxygen, fuel and water into the engine cylinder, after the intake valve closure, contributes to further reduction in engine size, since the cylinder becomes completely filled with recycled gas before oxygen, fuel and water are added. This increases the total mass of gas participating in combustion and permits a reduction in the size of the cylinder. The engine of the present invention can be about twice smaller than a conventional engine of comparable power. Such reduction in engine size is especially valuable in transportation vehicles, where it offers the advantage of lower weight and better packaging.

Still another object of the present invention is to reduce the amount of work needed to overcome the engine friction. Work of friction in internal-combustion engine is approximately proportional to the engine size. For reasons listed above, the engine of the present invention can be substantially smaller than a conventional air-breathing engine. A smaller engine has much less friction and hence a much better fuel economy.

Another object of the present invention is to eliminate the need for turbochargers and superchargers in internal-combustion engines. The engine of the present invention does not require a turbocharger or a supercharger for boosted operation. It is inherently self-supercharging. Increasing restriction to flow through a pressure-control valve increases pressure of combustion gas recycled back into intake manifold and supercharges the engine. Elimination of the need for expensive turbochargers or superchargers is a significant reduction in costs.

SUMMARY

An internal-combustion engine receives no air from outside atmosphere. Instead, combustion gas expelled from the engine is cooled and recycled back into the engine. Oxygen and fuel are added to the recycled gas, and the resulting mixture is used to perform an internal-combustion cycle. Cooling the gas condenses its water vapor, and liquid water is separated from the gas and collected in a water container. That water is used for injection into the recycled gas at a later time. A small amount of the expelled combustion gas is discharged through a pressure-control valve into outside environment, and the rest is recycled. Water too is recycled back into the engine, and the small amount that is lost to outside environment is replaced by reclaiming water produced in hydrocarbon fuel combustion. No additional supply of water is needed.

Since no air is inducted into the engine, no nitrogen takes part in the combustion process. The combustion gas recycled back into the engine consists mostly of carbon dioxide and water vapor. Since no nitrogen is present, no nitrogen oxides are produced. This removes one of the most significant deficiencies of internal-combustion engines, which, in their conventional incarnations, are prodigious producers of nitrogen oxides.

Another drawback of internal-combustion engines is unburned hydrocarbon and particulate matter emission, and this is greatly reduced too. Since most of the combustion gas is recycled back into the engine cylinders over-and-over again, an average particle of gas goes through the combustion process many times before it is discharged into outside environment. In such operation, most of the unburned hydrocarbons and particulate matter are repeatedly returned to the combustion chamber and are burned there. This removes the second major deficiency of internal-combustion engines.

The engine of the present invention can be considerably smaller than a conventional air-breathing engine with the same power capacity. This is because carbon dioxide, which is the main ingredient in the recycled combustion gas of the above described engine, is much heavier than nitrogen, which is the main ingredient in the intake air of a conventional engine. Therefore, a smaller engine cylinder can receive the same mass of gas as a larger cylinder in a conventional engine using air at the same pressure and temperature. Direct injection of oxygen and water into the engine cylinder, after the intake valve closure, contributes to further reduction in engine size, since the cylinder becomes completely filled with recycled gas before oxygen and water are added. This increases the total mass of gas participating in combustion and permits a further reduction in the size of the cylinder. Because of that, the engine of the present invention can be about twice smaller than a conventional engine of comparable power. A smaller engine has less friction and a much better fuel economy.

The engine of the present invention does not require a turbocharger or a supercharger for boosted operation. It is inherently self-supercharging. Increasing restriction to gas flow through a pressure-control valve increases the pressure of combustion gas recycled back into the engine intake manifold. There is less pressure blowdown at the end of the expansion stroke and more gas cooling is required, but the net result is a greater mass of gas flowing into cylinder chambers. There is no shortage of gas, since the mass of gas exiting a cylinder chamber is always greater than the mass of gas entering that chamber. Elimination of a turbocharger or a supercharger is a substantial reduction in cost.

DESCRIPTION OF THE PREFERRED EMBODIMENT

The method of the present invention can be applied both to four-stroke and to two-stroke engines. Both spark-ignition and compression ignition engines can be used.

1. Four-Stroke Engines

Figure 1:
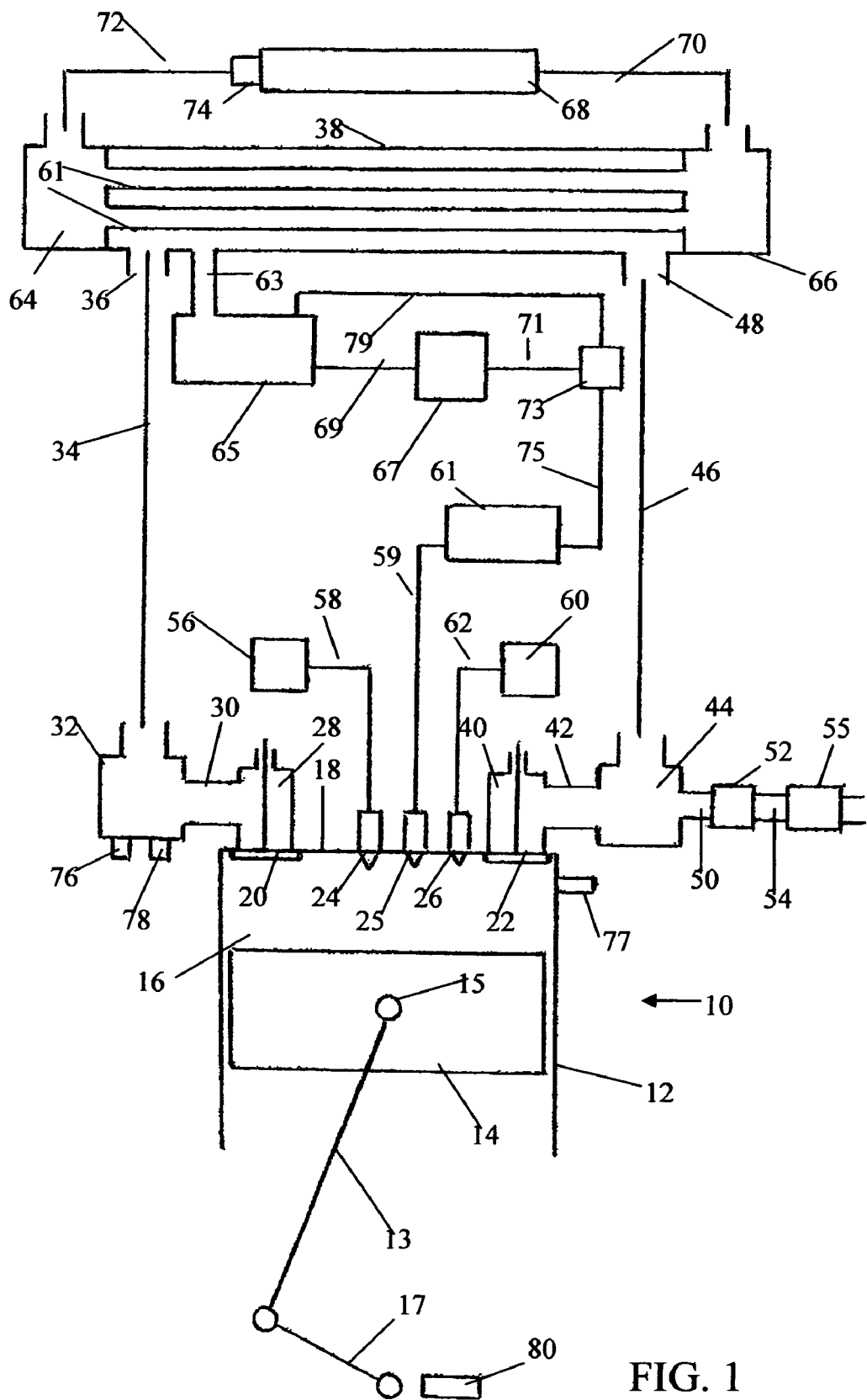
FIG. 1 is a schematic, cross-sectional side-view of an engine cylinder and head arrangement and its connections to sources of fuel, oxygen and recycled water and to a combustion-gas cooler.
Figure 2:
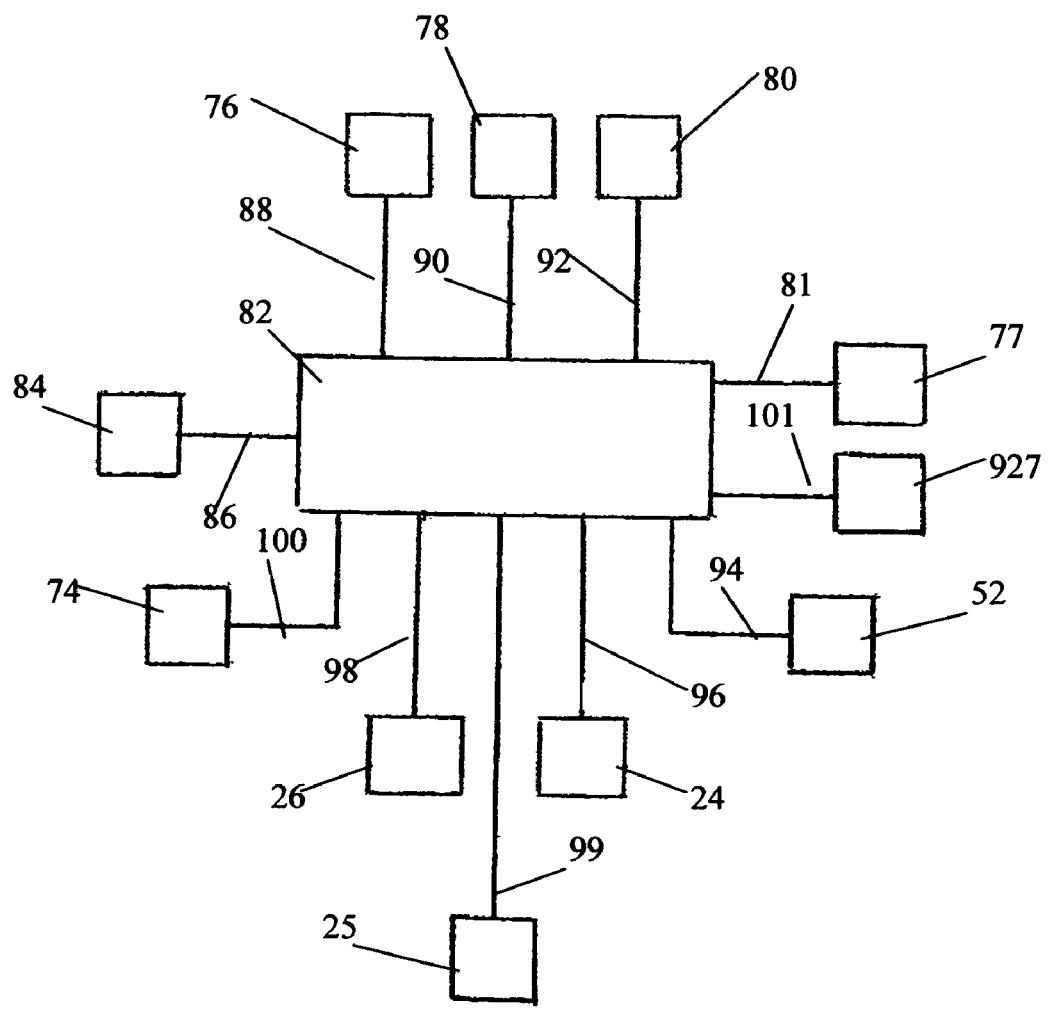
FIG. 2 is a schematic diagram illustrating a system of sensors sending input signals to the engine control system, which sends out output signals to actuators controlling operation of various components of the system.

A preferred embodiment of the present invention, as applied to a four-stroke piston-type engine, is illustrated in FIGS. 1 and 2. FIG. 1 is a schematic, cross-sectional side-view of an engine cylinder and head arrangement and its connections to sources of fuel, oxygen and recycled water and to a combustion-gas cooler. An engine 10 has at least one such cylinder. A cylinder 12 contains a piston 14, which is mounted upon a connecting rod 13 by a wrist pin 15 and can reciprocate in cylinder 12, thus varying the volume of a cylinder chamber 16 enclosed between piston 14 and a cylinder head 18 attached to the top of cylinder 12. Motion of piston 14 and of connection rod 13 is transmitted to crankshaft 17.

Two types of normally-closed valves, an intake valve 20 and an exhaust valve 22, are installed in cylinder head 18. The valves are operated by conventional means, such as camshafts (not shown). Depending on the needs of the engine, there may be more than one valve of each type in each engine cylinder. A fuel injector 24, a water injector 25 and an oxygen injector 26 are also mounted within cylinder head 18 and protrude into cylinder chamber 16. The fuel, water and oxygen injectors include actuators that can vary the magnitude, duration and timing of injector opening thus varying the timing and rate of injection and the quantity of injected fuel, water or oxygen, as the case may be.

Intake valve 20 is shown in its closed position, in which it separates cylinder chamber 16 from an intake port 28 that opens into an intake passage 30. Intake passage 30 connects to an intake manifold 32, to which all intake ports and all intake passages from all engine cylinders are connected. Intake manifold 32 is connected, via a pipe 34, to an outlet 36 from a gas cooler 38.

Exhaust valve 22 is shown in its closed position in which it separates cylinder chamber 16 from an exhaust port 40 that opens into an exhaust passage 42. Exhaust passage 42 connects to an exhaust manifold 44, to which all exhaust ports and all exhaust passages from all engine cylinders are connected. Exhaust manifold 44 is connected, via a pipe 46, to an inlet 48 into gas cooler 38. Exhaust manifold 44 is also connected, via a passage 50 to a pressure-control valve 52, from which an exhaust pipe 54 leads to outside atmosphere. Pressure-control valve 52 includes a controllably variable restriction to the flow of gas into exhaust pipe 54. A throttle valve controlled by a position-control stepper motor can serve as the pressure-control valve. An emission control module 55 may be incorporated into exhaust pipe 54. It may include a catalyst and a particulate matter filter.

Figure 9:
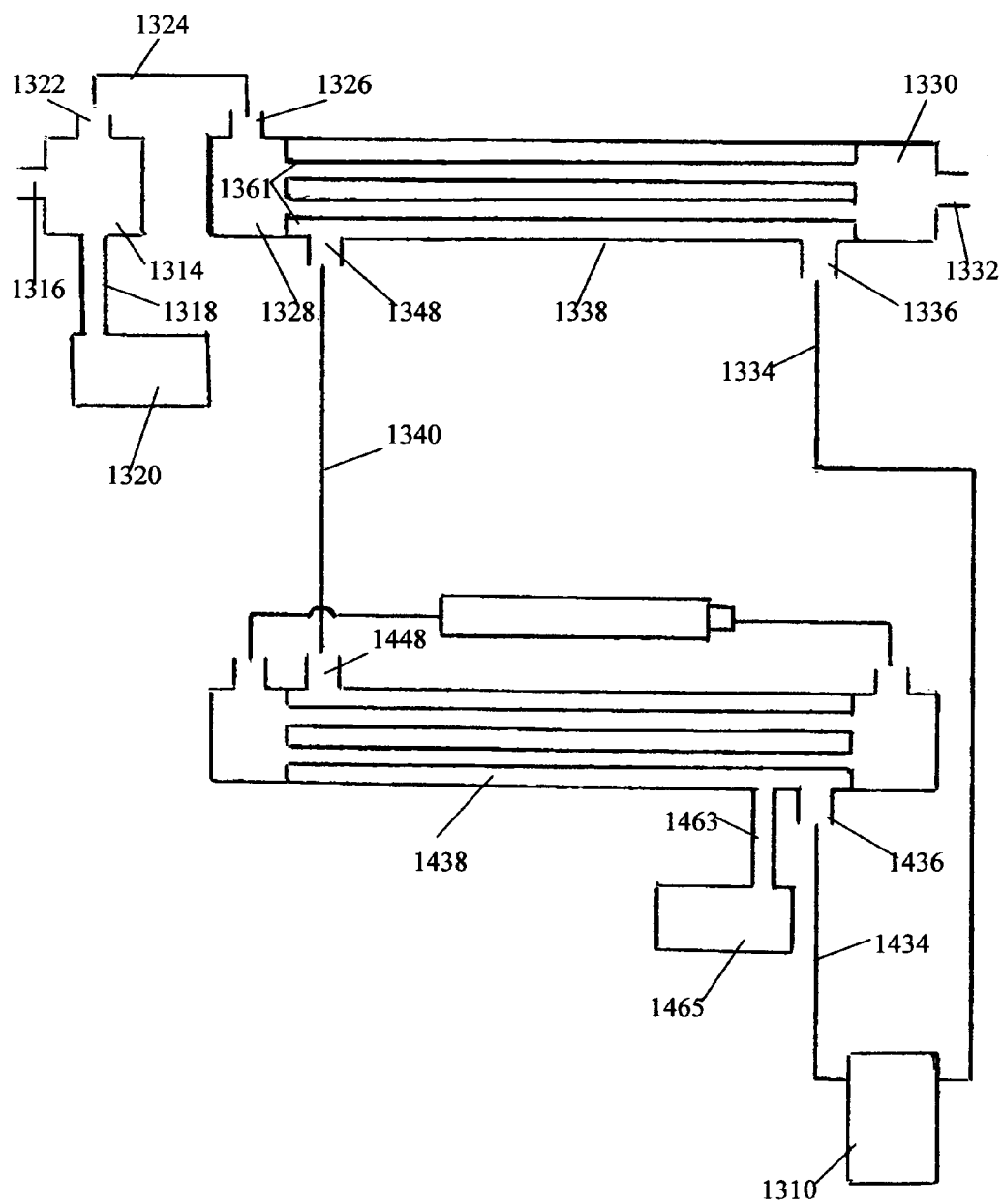
FIG. 9 is a schematic diagram illustrating a system for extracting oxygen out of atmospheric air and for using the remaining nitrogen and argon for combustion gas cooling.

Fuel injector 24 is connected, via a fuel line 58, to a fuel supply system 56. Water injector 25 is connected via a water supply line 59 to a water container 61. Oxygen injector 26 is connected, via an oxygen-supply line 62, to an oxygen-supply system 60. Both liquid and gaseous oxygen can be used. Oxygen can be stored in an on-site container that is periodically refilled or recharged. Oxygen can also be produced out of air in an on-site installation. That process can also be used to enhance combustion gas cooling. An example of such installation is illustrated in FIG. 9 and is described below in a section entitled "On-site Oxygen Production" within a chapter entitled "Description of Operation".

Inside gas cooler 38 (FIG. 1), a multitude of cooling pipes 61 connects an inlet chamber 64 to an outlet chamber 66. A heat-rejection system 68 receives cooling fluid from outlet chamber 66, via a pipe 70 and, after heat rejection, pumps it into inlet chamber 64 via a control valve 74 and a pipe 72. Control valve 74 includes a controllable restriction that controls the flow of fluid from heat-rejection system 68 into inlet chamber 64. A condensate pipe 63 connects interior of gas cooler 38 to a water collector 65. A water pump 67 is connected to water collector 65 via a low-pressure water line 69 and to water container 61 via a high-pressure water line 71, an overflow valve 73 and a high-pressure water line 75. A return line 79 connects overflow valve 73 to water collector 65.

Temperature and pressure sensors 76 and 78, respectively, are mounted into intake manifold 32. They measure the temperature and the pressure of the gas inside the intake manifold. A speed sensor 80, mounted in the vicinity of crankshaft 17, measures the engine speed. A cylinder pressure sensor 77 is mounted on the side of cylinder chamber 16. In other cases, cylinder pressure sensor 77 may be installed in cylinder head 18.

FIG. 2 is a schematic diagram illustrating a system of sensors sending input signals to the engine control system, which sends out output signals to actuators controlling operation of various components of the system. The signals generated by the sensors inform the control system about engine operator's demands for specific engine power and speed, as the case may be. The input signals also carry information on physical and operational conditions in various parts and components of the engine. The control system evaluates the received information and, in accordance with its internal logic, controls operation of the engine and its components, so as to satisfy the operator's demands while maintaining optimum fuel consumption efficiency and minimum exhaust emissions.

A control system 82 (FIG. 2) is an on-board computer programmed to control operation of various components of the engine in accordance with a strategy program incorporated into its software. The software contains algorithms and data that permit the control system to evaluate the stream of input signals and determine the magnitude and the timing of each output signal. The output signals control operation of the engine and its components and are updated at least once every engine cycle.

Control system 82 is connected to a control implement 84 via an electric wire 86. Control implement 84 is a device that permits the engine operator to manually control the engine operation by sending an appropriate control signal to the engine control system specifying the operator's demand for a specific engine power and speed. Control system 82 also receives input signals from intake manifold temperature and pressure sensors 76 and 78, respectively, to which it is connected via electric wires 88 and 90, respectively. It also receives an input signal from engine speed sensor 80 via an electric wire 92 and from cylinder pressure sensor 77 via an electric wire 81. Output signals go out of control system 82 to pressure-control valve 52 via an electric wire 94, to fuel injector 24 via an electric wire 96, to oxygen injector 26 via an electric wire 98, to water injector 25 via an electric wire 99 and to control valve 74 via an electric wire 100. In some variants, which involve steam injection into the cylinder chamber, as described below (see FIG. 4C), control system 82 controls a steam injector 927 (FIG. 4C) via an electric wire 101.

While FIG. 1 illustrates the basic design of the preferred embodiment, some other variants of the basic design are illustrated in FIGS. 3 and 4A to 4C.

Figure 3:
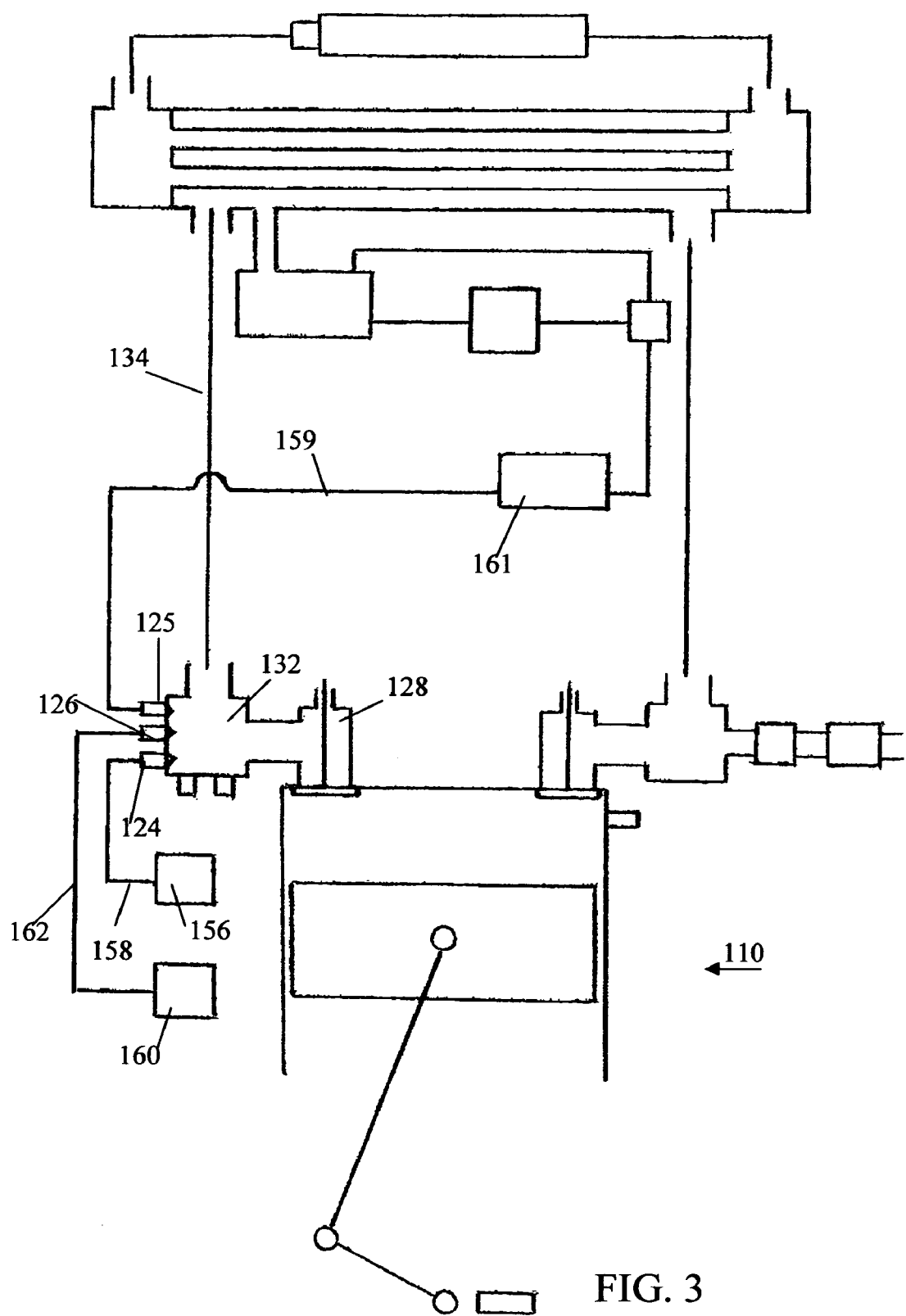
FIG. 3 is a schematic, cross-sectional side-view of another variant of the engine of the present invention, in which oxygen, fuel and water are added to the recycled combustion gas before the gas enters the engine cylinder chamber.

FIG. 3 is a schematic, cross-sectional side-view of another variant of the engine of the present invention, in which oxygen, fuel and water are added to the recycled combustion gas before the gas enters the engine cylinder chamber. In an engine 110 there are no oxygen, fuel and water injectors in the engine cylinder head. Instead, all three above injectors are installed in an intake manifold 132. In other cases, the injectors may be installed in an intake port 128, a pipe 134 or in other outside locations. A fuel injector 124 is connected to a fuel supply system 156 via a fuel line 158. An oxygen injector 126 is connected to an oxygen-supply system 160 via an oxygen-supply line 162. A water injector 125 is connected to a water container 161 via a water supply line 159. In all other respects, engine 110 is identical to engine 10 (FIG. 1). In some other variants, some of the above injectors may be installed in an outside location such as the intake manifold while other injectors are installed in the cylinder head.

Figure 4A:
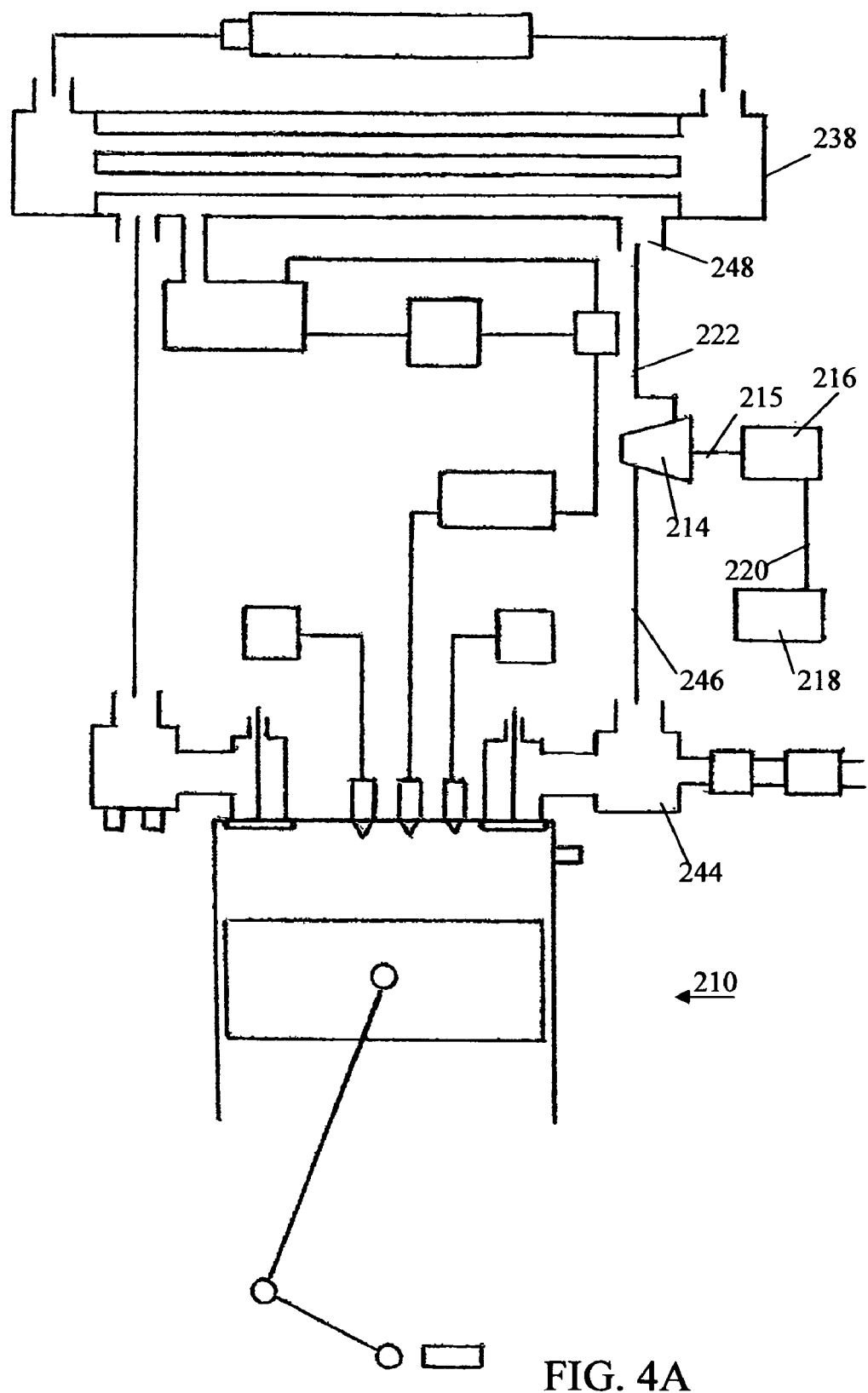
FIG. 4A is a schematic, cross-sectional side-view of still another variant of the engine of the present invention, in which some of the combustion gas energy is used for electric power generation.

FIG. 4A is a schematic, cross-sectional side-view of still another variant of the engine of the present invention, in which some of the combustion gas energy is used for electric power generation. In an engine 210 (FIG. 4A), hot combustion gas flowing out from an exhaust manifold 244 through a pipe 246 is diverted into a turbo-generator that includes a gas turbine 214 coupled, via a shaft 215, to an electric generator 216 that is connected to an electric battery 218 via an electric wire 220. From gas turbine 214 the gas flows into a gas cooler 238 via a pipe 222 and an inlet 248. In all other respects, engine 210 is identical to engine 10 (FIG. 1).

Figure 4B:
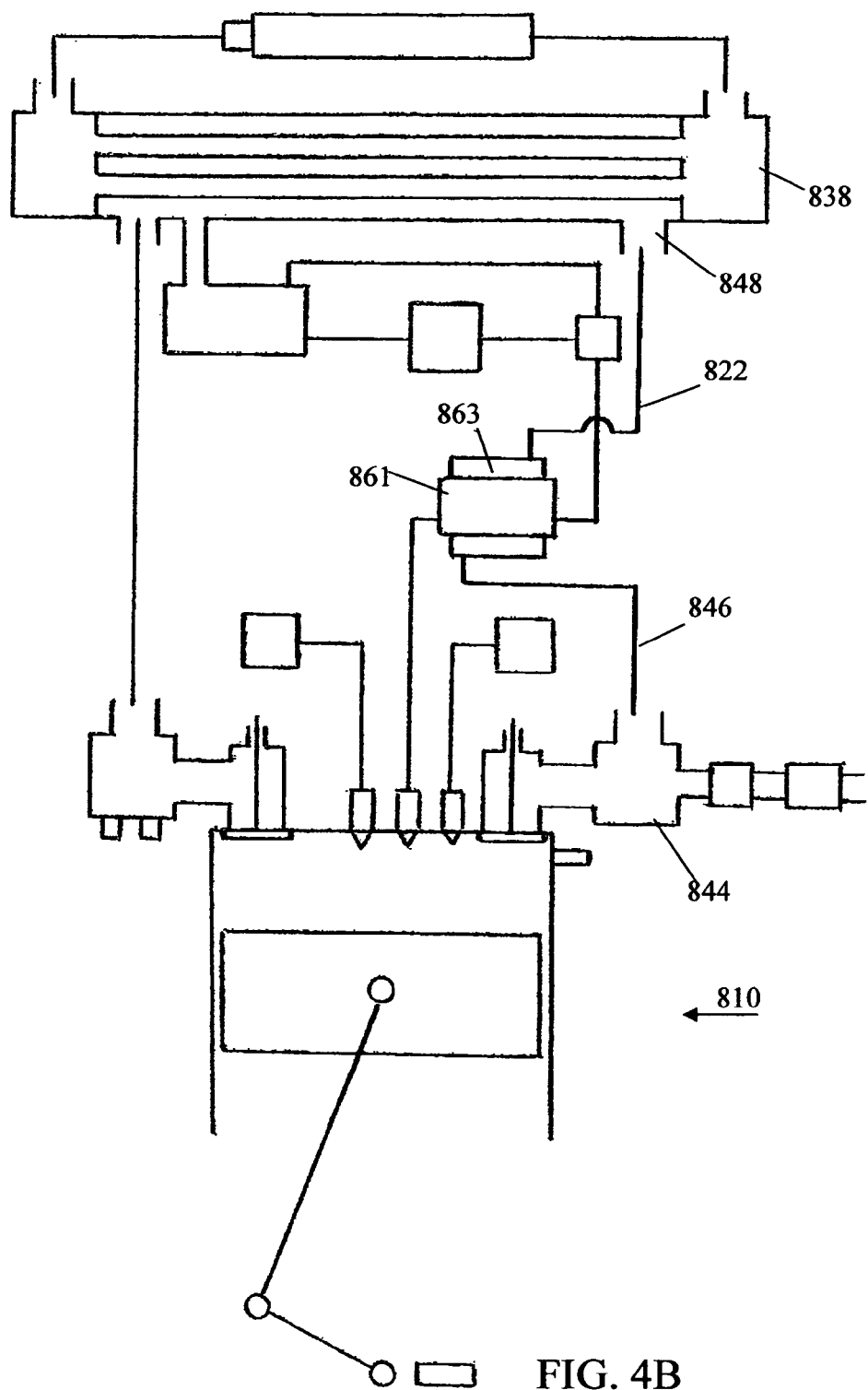
FIG. 4B is a schematic, cross-sectional side-view of still another variant of the engine of the present invention, in which some of the combustion gas energy is used to heat the water that is to be injected into the recycled combustion gas.

FIG. 4B is a schematic, cross-sectional side-view of still another variant of the engine of the present invention, in which some of the combustion gas energy is used to heat the water that is to be injected into the recycled combustion gas. In an engine 810 (FIG. 4B), a water container 861 is equipped with a heating jacket 863. Hot combustion gas flowing out from an exhaust manifold 844 through a pipe 846 is diverted to water container 861, passes through heating jacket 863 and flows into a gas cooler 838 via a pipe 822 and an inlet 848. In all other respects, engine 810 is identical to engine 10 (FIG. 1).

Figure 4C:
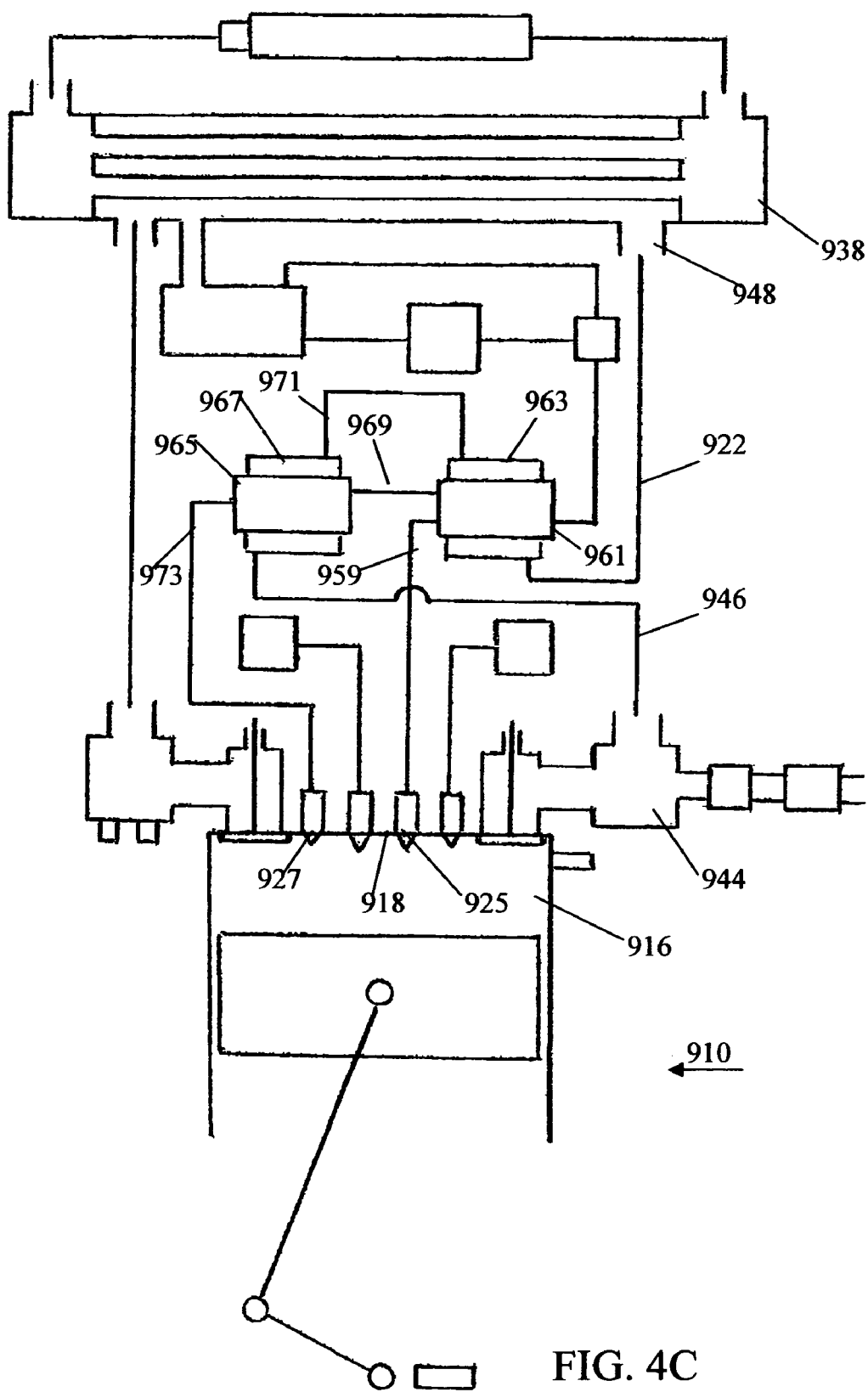
FIG. 4C is a schematic, cross-sectional side-view of still another variant of the engine of the present invention, in which some of the combustion gas energy is used to heat the water that is to be injected into the recycled combustion gas, and some of the gas energy is used to convert some of that water into a superheated steam for its subsequent injection into the engine cylinder.

FIG. 4C is a schematic, cross-sectional side-view of still another variant of the engine of the present invention, in which some of the combustion gas energy is used to heat the water that is to be injected into the recycled combustion gas, and some of the gas energy is used to convert some of that water into a superheated steam for its subsequent injection into the engine cylinder. In an engine 910 (FIG. 4C), a water container 961 is equipped with a heating jacket 963. The system also includes a superheater 965 equipped with a heating jacket 967. A pipe 969 connects upper part of the interior of water container 961 to the interior of superheater 965. The lower part of the interior of water container 961 is connected to a water injector 925 via a pipe 959. A pipe 971 connects heating jackets 963 and 967. Hot combustion gas flowing out from an exhaust manifold 944 through a pipe 946 is diverted to a superheater 965, passes through heating jacket 967, flows through pipe 971, passes through heating jacket 963 and flows into a gas cooler 938 via a pipe 922 and an inlet 948. A steam injector 927 is installed in a cylinder head 918, and it protrudes into a cylinder chamber 916. Steam injector 927 is connected to the interior of superheater 965 via a pipe 973. In all other respects, engine 910 is identical to engine 10 (FIG. 1).

2. Split-Cycle Engine

A split-cycle engine is a two-stroke internal-combustion engine, in which the engine cycle is split into two two-stroke parts taking place in two separate but interconnected cylinders. Gas intake and compression take place in a compression cylinder, while combustion, expansion and exhaust take place in an expander cylinder.

Figure 5:
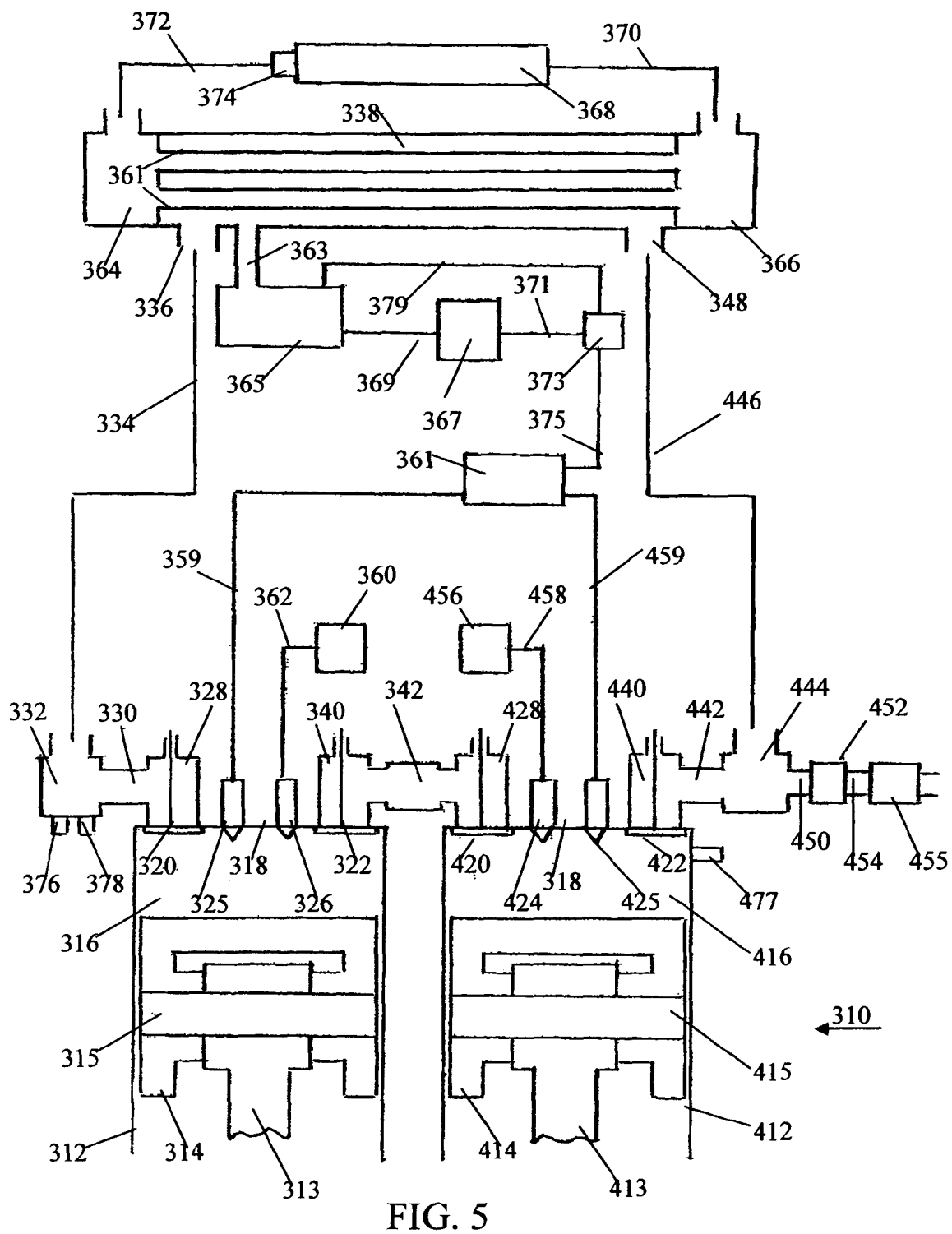
FIG. 5 is a schematic, cross-sectional view of two engine cylinders and their connection to each other as well as connections to sources of fuel, oxygen and recycled water and to a combustion-gas cooler.
Figure 6:
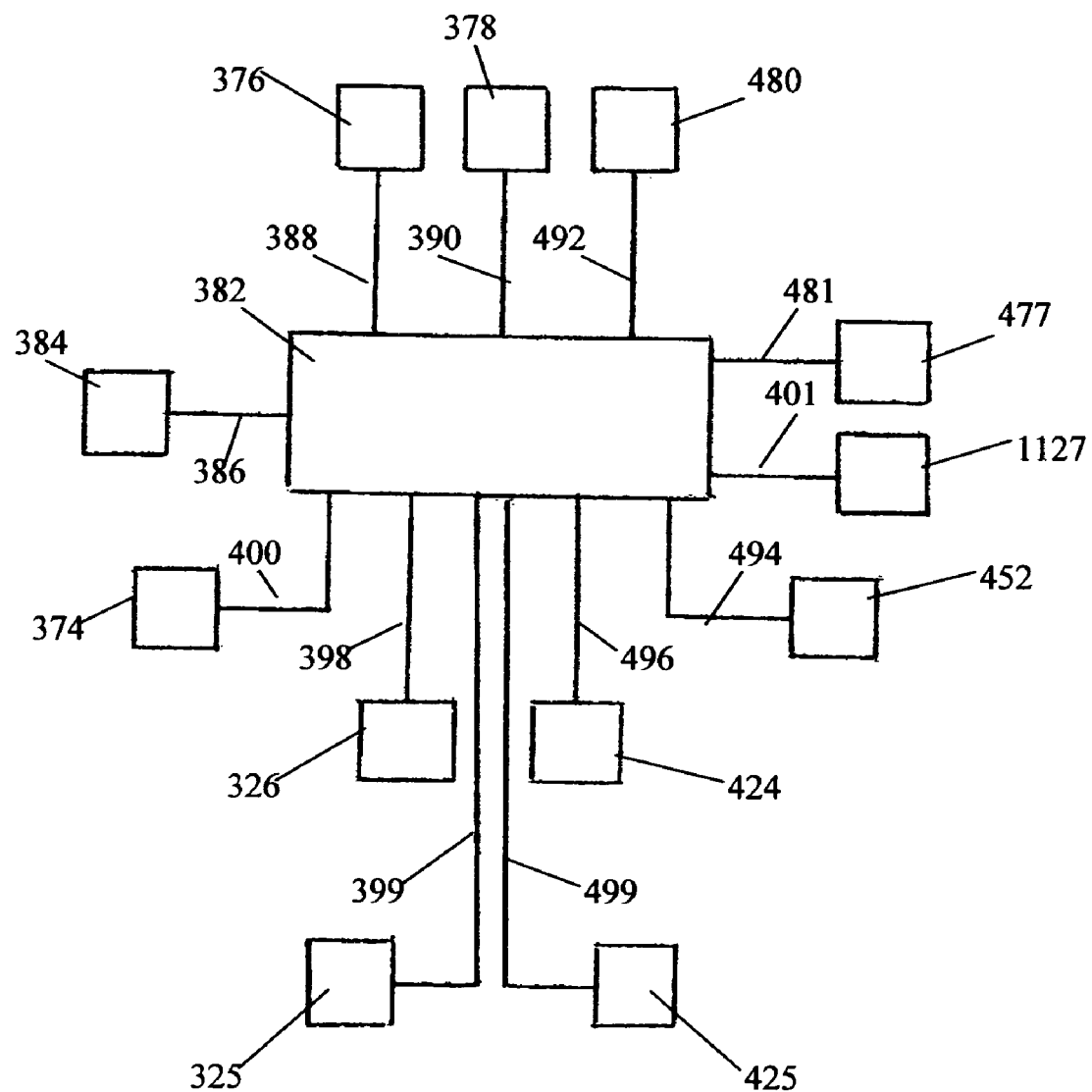
FIG. 6 is a schematic diagram illustrating a system of sensors sending input signals to the engine control system, which sends out output signals to actuators controlling operation of various components of the system.

A preferred embodiment of the present invention, as applied to a split-cycle two-stroke piston-type engine, is illustrated in FIGS. 5 and 6. FIG. 5 is a schematic, cross-sectional view of two engine cylinders and their connection to each other as well as connections to sources of fuel, oxygen and recycled water and to a combustion-gas cooler.

An engine 310 has at least two such cylinders. A compressor cylinder 312 contains a piston 314, which is mounted upon a connecting rod 313 by a wrist pin 315 and can reciprocate in cylinder 312, thus varying the volume of a compressor chamber 316 enclosed between piston 314 and a cylinder head 318 attached to the top of cylinder 312. Motion of piston 314 and of connection rod 313 is transmitted to the engine crankshaft (not shown).

Two types of normally-closed valves, an intake valve 320 and an outlet valve 322, are installed in cylinder head 318. The valves are operated by conventional means, such as camshafts (not shown). Depending on the needs of the engine, there may be more than one valve of each type in each engine cylinder. An oxygen injector 326 and a water injector 325 are also mounted within cylinder head 318 and protrude into compressor chamber 316. The oxygen and water injectors include actuators that can vary the magnitude, duration and timing of injector opening thus varying the timing and the rate of injection and the quantity of injected oxygen and water, as the case may be.

Intake valve 320 is shown in its closed position, in which it separates compressor chamber 316 from an intake port 328 that opens into an intake passage 330. Intake passage 330 connects to an intake manifold 332, to which all intake ports and all intake passages from all compressor cylinders are connected. Intake manifold 332 is connected, via a pipe 334, to an outlet 336 from a gas cooler 338. Outlet valve 322 is shown in its closed position in which it separates compressor chamber 316 from an outlet port 340 that connects to a transfer manifold 342, to which all outlet ports in all compressor cylinders are connected.

Water injector 325 is connected via a water supply line 359 to a water container 361. Oxygen injector 326 is connected, via an oxygen-supply line 362, to an oxygen-supply system 360. Both liquid and gaseous oxygen can be used. Oxygen can be stored in an on-site container that is periodically refilled or recharged. Oxygen can also be produced out of air in an on-site installation. That process can also be used to enhance combustion gas cooling. An example of such installation is illustrated in FIG. 9 and is described below in a section entitled "On-site Oxygen Production" within a chapter entitled "Description of Operation".

Temperature and pressure sensors 376 and 378, respectively, are mounted into intake manifold 332. They measure the temperature and the pressure of the gas inside the intake manifold.

An expander cylinder 412 contains a piston 414, which is mounted upon a connecting rod 413 by a wrist pin 415 and can reciprocate in cylinder 412, thus varying the volume of an expander chamber 416 enclosed between piston 414 and a cylinder head 318 attached to the top of cylinder 412. Cylinder head 318 is common for both cylinders 312 and 412 (in some other cases the two cylinders may have different cylinder heads). Motion of piston 414 and of connection rod 413 is transmitted to the same engine crankshaft (not shown), to which connecting rod 313 is connected.

Two types of normally-closed valves, an inlet valve 420 and an exhaust valve 422, are installed in cylinder head 318. The valves are operated by conventional means, such as camshafts (not shown). Depending on the needs of the engine, there may be more than one valve of each type in each engine cylinder. A fuel injector 424 and a water injector 425 are also mounted within cylinder head 318 and protrude into expander chamber 416. The fuel and water injectors include actuators that can vary the magnitude, duration and timing of injector opening thus varying the timing and the rate of injection and the quantity of injected fuel and water, as the case may be.

Inlet valve 420 is shown in its closed position, in which it separates expander chamber 416 from an inlet port 428 that connects to transfer manifold 342, to which all inlet ports in all expander cylinders are connected.

Exhaust valve 422 is shown in its closed position in which it separates expander chamber 416 from an exhaust port 440 that connects to an exhaust passage 442. Exhaust passage 442 connects to an exhaust manifold 444, to which all exhaust ports and all exhaust passages from all expander cylinders are connected. Exhaust manifold 444 is connected, via a pipe 446, to an inlet 348 into gas cooler 338. Exhaust manifold 444 is also connected, via a passage 450 to a pressure-control valve 452, from which an exhaust pipe 454 leads to outside atmosphere. Pressure-control valve 452 includes a controllably variable restriction to the flow of gas into exhaust pipe 454. A throttle valve controlled by a position-control stepper motor can serve as pressure-control valve. An emission control module 455 may be incorporated into exhaust pipe 454. It may include a catalyst and a particulate matter filter.

Fuel injector 424 is connected, via a fuel line 458, to a fuel supply system 456. Water injector 425 is connected via a water supply line 459 to water container 361.

Inside gas cooler 338, a multitude of cooling pipes 361 connects inlet chamber 364 to outlet chamber 366. A heat-rejection system 368 receives cooling fluid from outlet chamber 366, via a pipe 370 and, after heat rejection, pumps it into inlet chamber 364 via a control valve 374 and a pipe 372. Control valve 374 includes a controllable restriction that controls the flow of fluid from heat-rejection system 368 into inlet chamber 364. A condensate pipe 363 connects interior of gas cooler 338 to a water collector 365. A water pump 367 is connected to water collector 365 via a low-pressure water line 369 and to water container 361 via a high-pressure water line 371, an overflow valve 373 and a high-pressure water line 375. A return line 379 connects overflow valve 373 to water collector 365.

A cylinder pressure sensor 477 is mounted on the side of expander chamber 416. In other cases, cylinder pressure sensor 477 may be installed in cylinder head 318. The system also includes an engine speed sensor (not shown) that is installed in the vicinity of the engine crankshaft.

FIG. 6 is a schematic diagram illustrating a system of sensors sending input signals to the engine control system, which sends out output signals to actuators controlling operation of various components of the system. The signals generated by the sensors inform the control system about engine operator's demands for specific engine power and speed, as the case may be. The input signals also carry information on physical and operational conditions in various parts and components of the engine. The control system evaluates the received information and, in accordance with its internal logic, controls operation of the engine and its components, so as to satisfy the operator's demands while maintaining optimum fuel consumption efficiency and minimum exhaust emissions.

A control system 382 (FIG. 6) is an on-board computer programmed to control operation of various components of the engine in accordance with a strategy program incorporated into its software. The software contains algorithms and data that permit the control system to evaluate the stream of input signals and determine the magnitude and the timing of each output signal. The output signals control operation of the engine and its components and are updated at least once every engine cycle.

Control system 382 is connected to a control implement 384 via an electric wire 386. Control implement 384 is a device that permits the engine operator to manually control the engine operation by sending an appropriate control signal to the engine control system specifying the operator's demand for a specific engine power and speed. Control system 382 also receives input signals from intake manifold temperature and pressure sensors 376 and 378, respectively, to which it is connected via electric wires 388 and 390, respectively. It also receives an input signal from an engine speed sensor 480 via an electric wire 492 and from cylinder pressure sensor 477 via electric wire 481. Output signals go out of control system 382 to pressure-control valve 452 via an electric wire 494, to fuel injector 424 via an electric wire 496, to oxygen injector 326 via an electric wire 398, to water injectors 325 and 425 via electric wires 399 and 499, respectively, and to control valve 374 via an electric wire 400. In some variants, which involve steam injection into the cylinder chamber, as described below (see FIG. 8C), control system 382 controls a steam injector 1127 (see FIG. 8C) via an electric wire 401.

While FIG. 5 illustrates the basic design for the split-cycle engine, some other variants of the basic design are illustrated in FIGS. 7 and 8A to 8C.

Figure 7:
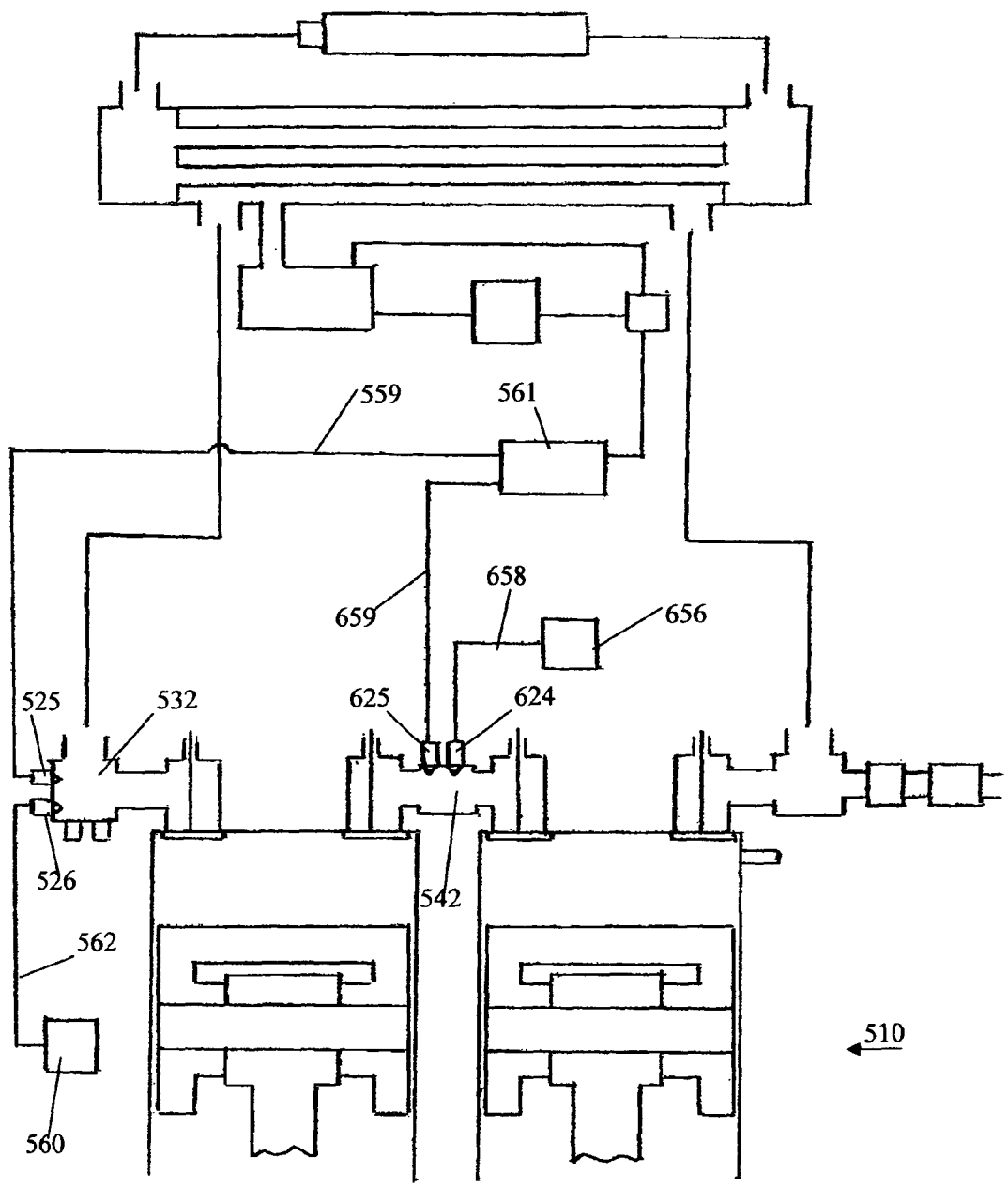
FIG. 7 is a schematic, cross-sectional view of another variant of the split-cycle engine of the present invention, in which oxygen, fuel and water are added to the recycled combustion gas before the gas enters the engine cylinders.

FIG. 7 is a schematic, cross-sectional view of another variant of the split-cycle engine of the present invention, in which oxygen, fuel and water are added to the recycled combustion gas before the gas enters the engine cylinders. In an engine 510 there are no oxygen, fuel and water injectors in the engine cylinder head. Instead, an oxygen injector 526 and a water injector 525 are installed in an intake manifold 532, and a fuel injector 624 and a water injector 625 are installed in a transfer manifold 542. In other cases, the injectors may be installed in other outside locations. A fuel injector 624 is connected to a fuel supply system 656 via a fuel line 658. An oxygen injector 526 is connected to an oxygen-supply system 560 via an oxygen-supply line 562. Water injectors 525 and 625 are connected to a water container 561 via water supply lines 559 and 659, respectively. In all other respects, engine 510 is identical to engine 310 (FIG. 5). In some other variants, some of the above injectors may be installed in the intake and transfer manifolds while other injectors are installed in the cylinder head.

Figure 8A:
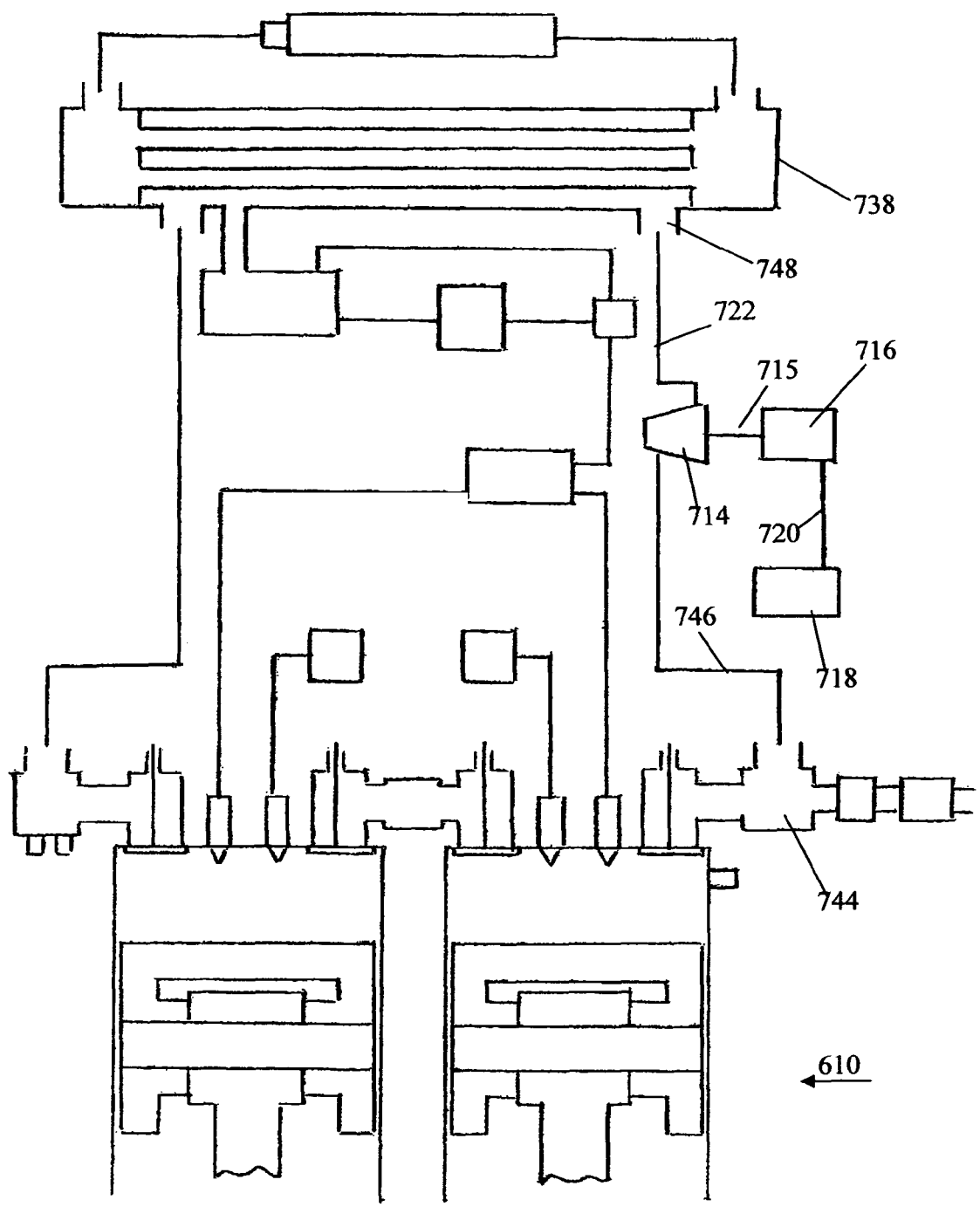
FIG. 8A is a schematic, cross-sectional view of still another variant of the engine of the present invention, in which some of the combustion gas energy is used for electric power generation.

FIG. 8A is a schematic, cross-sectional view of still another variant of the engine of the present invention, in which some of the combustion gas energy is used for electric power generation. In engine 610 (FIG. 8A), hot combustion gas flowing out from an exhaust manifold 744 through a pipe 746 is diverted into a turbo-generator that includes a gas turbine 714 coupled, via a shaft 715, to an electric generator 716 that is connected to an electric battery 718 via an electric wire 720. From gas turbine 714 the gas flows into a gas cooler 738 via a pipe 722 and an inlet 748. In all other respects, engine 610 is identical to engine 310 (FIG. 5).

Figure 8B:
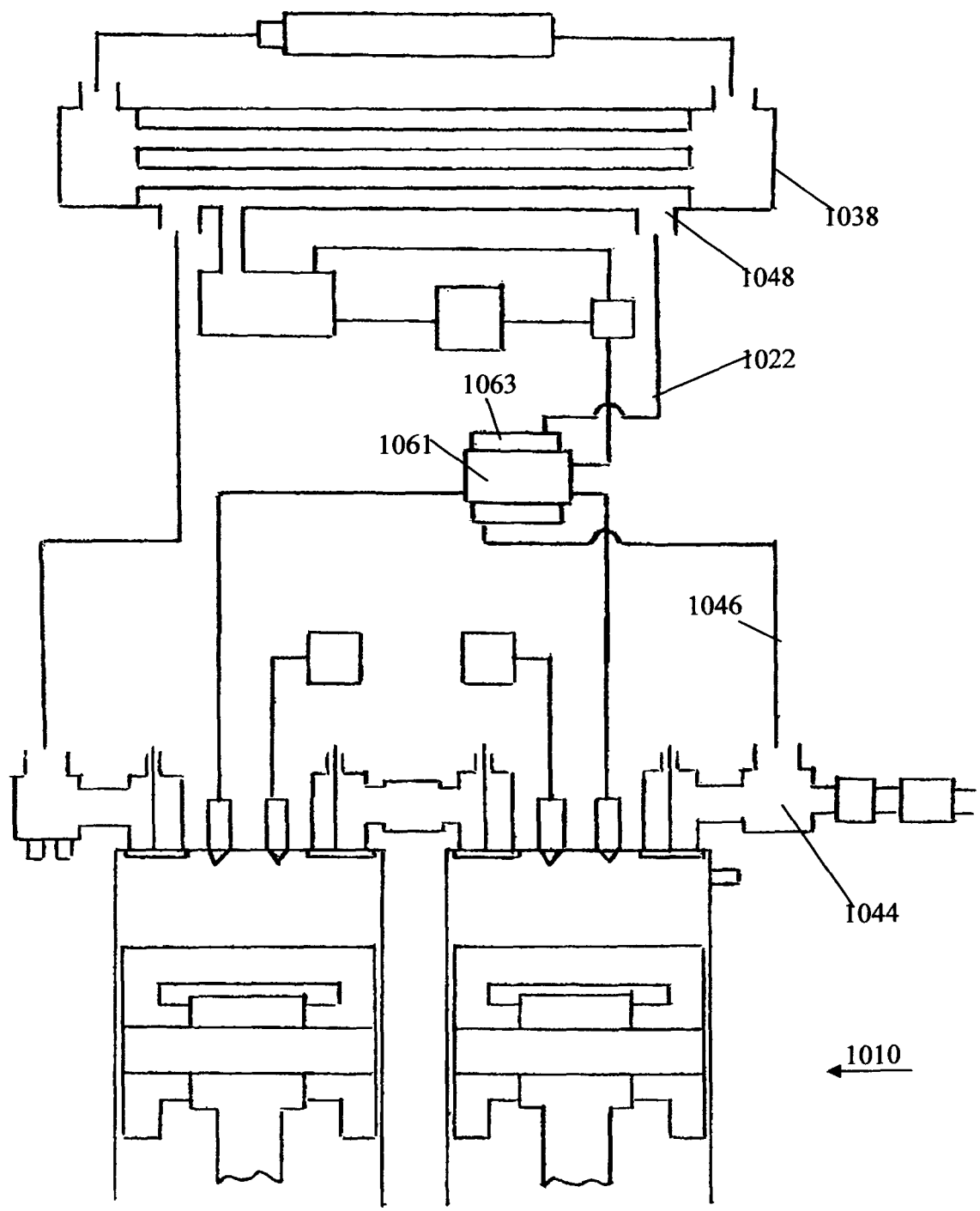
FIG. 8B is a schematic, cross-sectional side-view of still another variant of the engine of the present invention, in which some of the combustion gas energy is used to heat the water that is to be injected into the recycled combustion gas.

FIG. 8B is a schematic, cross-sectional side-view of still another variant of the engine of the present invention, in which some of the combustion gas energy is used to heat the water that is to be injected into the recycled combustion gas. In an engine 1010 (FIG. 8B), a water container 1061 is equipped with a heating jacket 1063. Hot combustion gas flowing out from an exhaust manifold 1044 through a pipe 1046 is diverted to water container 1061, passes through heating jacket 1063 and flows into a gas cooler 1038 via a pipe 1022 and an inlet 1048. In all other respects, engine 1010 is identical to engine 310 (FIG. 5).

Figure 8C:
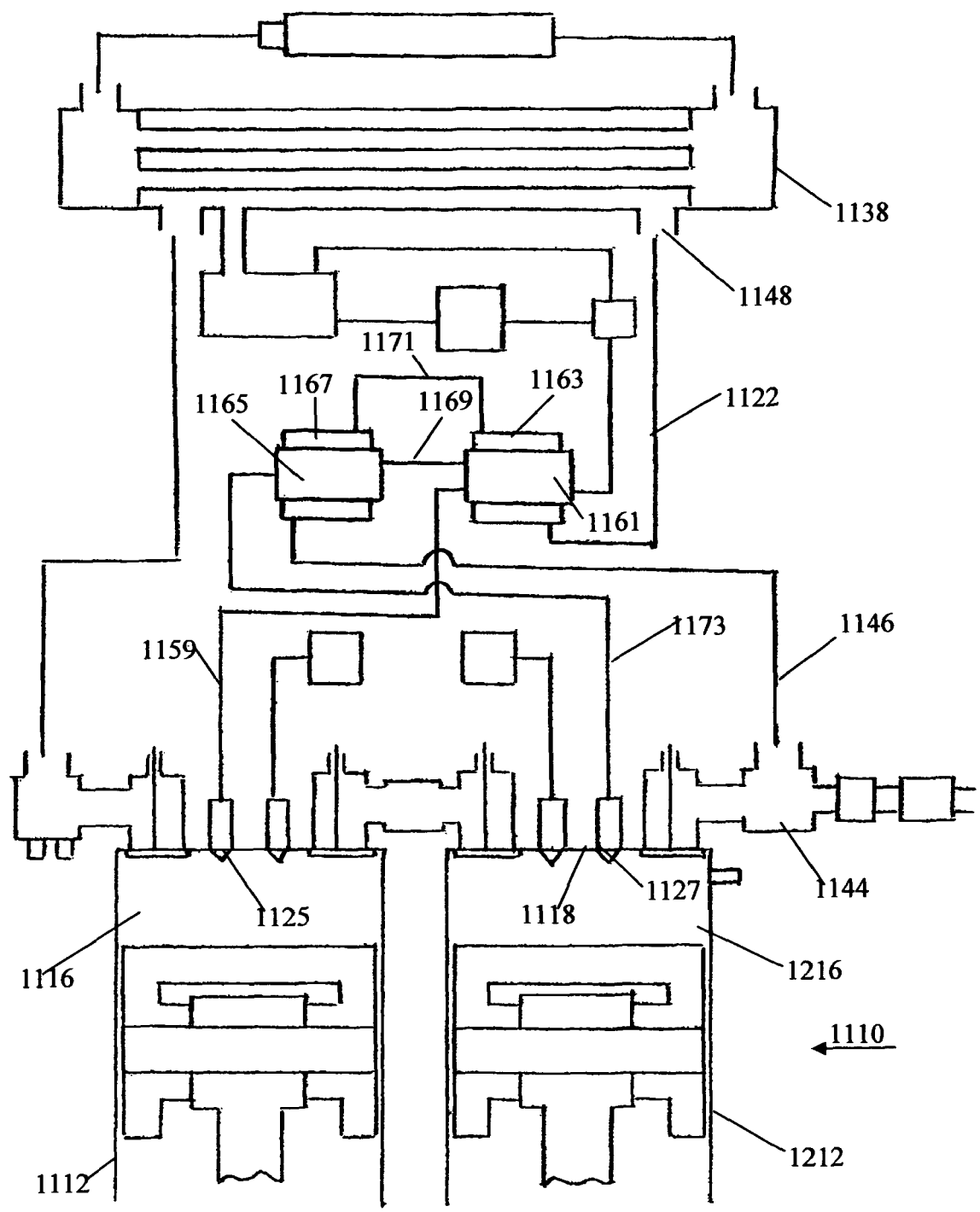
FIG. 8C is a schematic, cross-sectional side-view of still another variant of the engine of the present invention, in which some of the combustion gas energy is used to heat the water that is to be injected into the recycled combustion gas, and some of the gas energy is used to convert some of that water into a superheated steam for its subsequent injection into the engine cylinder.

FIG. 8C is a schematic, cross-sectional side-view of still another variant of the engine of the present invention, in which some of the combustion gas energy is used to heat the water that is to be injected into the recycled combustion gas, and some of the gas energy is used to convert some of that water into a superheated steam for its subsequent injection into the engine cylinder. In an engine 1110 (FIG. 8C), a water container 1161 is equipped with a heating jacket 1163. The system also includes a superheater 1165 equipped with a heating jacket 1167. A pipe 1169 connects upper part of the interior of water container 1161 to the interior of superheater 1165. A pipe 1171 connects heating jackets 1163 and 1167. Hot combustion gas flowing out from an exhaust manifold 1144 through a pipe 1146 is diverted to superheater 1165, passes through heating jacket1167, flows through pipe 1171, passes through heating jacket 1163 and flows into a gas cooler 1138 via a pipe 1122 and an inlet 1148. A steam injector 1127 is installed in cylinder head 1118, and it protrudes into an expander chamber 1216. In all other respects, engine 1110 is identical to engine 310 (FIG. 5).

DESCRIPTION OF OPERATION

The engine of the present invention receives no air from outside atmosphere. Instead, combustion gas expelled from the engine is cooled and recycled back into the engine. That gas contains no nitrogen and consists mostly of carbon dioxide and water vapor. When oxygen is added to such gas, it forms a kind of "artificial air" that can be used for combustion in the engine. Cooling the gas condenses its water vapor, and liquid water is separated from the gas and collected in a water container. Oxygen, water and fuel are added to the recycled gas, and the resulting mixture is used to perform an internal-combustion cycle. A small amount of the expelled combustion gas is discharged into outside environment, and the rest is recycled. A more detailed description of the engine operation is given below, with references to FIGS. 1 and 2.

1. Four-Stroke Engines

Engine 10 (FIG. 1) operates in a gas-recycling mode that requires no air induction into the engine. Most of the combustion gas expelled from each engine cylinder, at the end of each cycle, flows into gas cooler 38 via pipe 46. There, the gas is cooled, and at least some of its water vapor is condensed into liquid water that flows into water collector 65 via condensate pipe 63. Water pump 67 receives water from water collector 65 through low-pressure water line 69 and pumps it, under pressure, into water container 61. Pressurized water flows from water pump 67 through high-pressure water line 71, overflow valve 73 and high-pressure water line 75 into water container 61. Excess water returns from overflow valve 73, through return line 79, back into water collector 65.

Engine 10 inducts cooled combustion gas from gas cooler 38 into cylinder chamber 16 during piston 14 first volume-increasing stroke, when piston 14 moves away from cylinder head 18. During the first volume-increasing stroke, intake valve 20 is open while exhaust valve 22 is closed, and gas flows from gas cooler 38 through outlet 36, pipe 34, intake manifold 32, intake passage 30, intake port 28 and intake valve 20 into cylinder chamber 16. During a subsequent first volume-decreasing stroke, when piston 14 moves towards cylinder head 18, both intake valve 20 and exhaust valve 22 are closed and the gas inside cylinder chamber 16 is compressed. Oxygen and water are injected through oxygen injector 26 and through water injector 25, respectively, into cylinder chamber 16 during the early part of the first volume-decreasing stroke, and fuel is injected through fuel injector 24 into cylinder chamber 16 during late part of the first volume-decreasing stroke. In some other cases, water or oxygen, or both may be injected during the first volume-increasing stroke. As a result, a combustible mixture of recycled gas, water, oxygen and fuel forms inside cylinder chamber 16. Oxygen is supplied to oxygen injector 26 from oxygen-supply system 60 via oxygen-supply line 62. Fuel is supplied to fuel injector 24 from fuel-supply system 56 via fuel-supply line 58. Pressurized water is supplied to water injector 25 from water container 61 via water-supply line 59.

During the first volume-decreasing stroke, water injected into cylinder chamber 16 evaporates. Water evaporation absorbs the heat produced in compression and restricts the pressure and temperature rise. As long as there is liquid water in cylinder chamber 16, the temperature of gas in that chamber is determined by the temperature of the boiling point of water. Thus the compression of gas takes place at near-constant temperature.

As piston 14 approaches its top-dead-center position (TDC), the combustible mixture is ignited and its combustion begins. Compression ignition is the preferred method of ignition, but other means for assisting or inducing the ignition, such as glow plugs and spark plugs, can be used too. Combustion is completed during early part of a second volume-increasing stroke and the combustible mixture turns into a high-pressure hot combustion gas. Water is injected into cylinder chamber 16 during the early part of the second volume-increasing stroke and turns into superheated steam. During the remaining part of that stroke, expanding combustion gas and high-pressure steam perform mechanical work on piston 14. As piston 14 approaches its bottom-dead-center position (BDC), exhaust valve 22 opens, and pressure in cylinder chamber 16 drops to the level of pressure in exhaust manifold 44.

During a second volume-decreasing stroke, exhaust valve 22 is open while intake valve 20 is closed, and hot combustion gas and steam are expelled from cylinder chamber 16 and flow into gas cooler 38. The gas flows from cylinder chamber 16 through exhaust valve 22, exhaust port 40, exhaust passage 42, exhaust manifold 44, pipe 46 and inlet 48 into gas cooler 38. A small fraction of the gas is discharged from exhaust manifold 44 through passage 50 and pressure-control valve 52 into exhaust pipe 54 that is connected to outside atmosphere.

The mass of gas inducted into cylinder chamber 16, via intake manifold 32, must be equal to the mass displaced into gas cooler 38 from exhaust manifold 44, less water removed from the gas. The mass of gas discharged from cylinder chamber 16 into exhaust manifold 44 is equal to the mass inducted into cylinder chamber 16 plus the mass of oxygen, water and fuel injected. The mass of water injected into the gas in cylinder chamber 16 is equal to the mass of water vapor that was previously removed from that gas in gas cooler 38. Therefore, on average, the mass of gas discharged through pressure-control valve 52 is equal to the mass of fuel and oxygen injected into the engine cylinders, and the rest of the gas flows into gas cooler 38. If the area of the controllable restriction incorporated into pressure-control valve 52 is decreased or increased, the flow of gas through pressure-control valve 52 temporarily decreases or increases, respectively, and the pressure of gas in exhaust manifold 44 increases or decreases, respectively, until the flow through pressure-control valve 52 is restored. In that way, pressure of gas flowing into cylinder chamber 16 can be controlled. Controlling the pressure of the recycled gas controls the mass of gas inducted into the engine.

Inside gas cooler 38, hot combustion gas comes into contact with a multitude of cooling pipes 61 and looses a substantial portion of its heat to cooling fluid flowing inside cooling pipes 61. When the temperature of gas drops to the temperature of the dew point for water, water vapor begins to condense into liquid water. Some of that water forms a fine mist of tiny droplets carried by the gas, but most of it precipitates and condenses on the surfaces of cooling pipes 61 and on the inner walls of gas cooler 38. That water drips to the bottom of gas cooler 38 and flows into water collector 65 through condensate pipe 63. The amount of water produced depends on the amount of heat taken out of the gas flowing through gas cooler 38, which can be controlled by controlling the flow of cooling fluid through cooling pipes 61. Control valve 74 controls that flow. If sufficient amount of heat is taken out of the gas, all of its water vapor is condensed and removed, and the remaining gas consists almost entirely of carbon dioxide In other cases, some water vapor may still remain in that gas Adding oxygen to that gas turns it into "artificial air", which is a gaseous mixture of carbon dioxide, and oxygen and is used by the engine instead of atmospheric air. Cooled gas exits gas cooler 38 through outlet 36 and flows back into the engine, where the above cycle is repeatedly performed in each engine cylinder.

Heat-rejection system 68 pumps cooling fluid through gas cooler 38. The cooling fluid absorbs heat from combustion gas in gas cooler 38 and rejects that heat to outside environment in heat-rejection system 68. Cooling fluid flows from heat-rejection system 68 through control valve 74, pipe 72, inlet chamber 64 and multitude of cooling pipes 61 into outlet chamber 66. From there, it returns to heat-rejection system 68 via pipe 70. Operation of heat-rejection system 68 can be similar to operation of a conventional engine cooling system, which usually includes an air blower blowing atmospheric air through a radiator that carries the cooling fluid. In most cases, heat-rejection system 68 may be integrated with the rest of the engine cooling system.

Control of the engine operation is illustrated in FIG. 2. Control system 82 is an on-board computer programmed to control operation of various components of the engine in accordance with a strategy program incorporated into its software. The software contains algorithms and data that permit the control system to evaluate the stream of input signals and determine the magnitude and the timing of each output signal. The output signals control operation of the engine and its components and are updated at least once every engine cycle.

Control system 82 receives a control signal via electric wire 86 from control implement 84, which specifies the engine operator's demand for a specific engine power and speed. The control system evaluates the received information and, in accordance with its internal logic, controls operation of the engine and its components, so as to satisfy the operator's demands while maintaining optimum fuel consumption efficiency and minimum exhaust emissions. Control system 82 also receives input signals from intake manifold temperature and pressure sensors 76 and 78, respectively, to which it is connected via electric wires 88 and 90, respectively. It also receives input signals from engine speed sensor 80 via electric wire 92 and from cylinder pressure sensor 77 via electric wire 81.

Control system 82 controls operation of engine 10 (FIG. 1) by varying the quantity of fuel, water and oxygen injected into cylinder chamber 16 during each cycle. It also controls the pressure and temperature of the recycled combustion gas flowing back into the engine. The injected fuel quantity is controlled by sending a control signal to fuel injector 24 via electric wire 96. That signal controls the duration of the injector opening, and the timing of the signal determines the timing of the injection. The injected oxygen quantity is controlled by sending a control signal to oxygen injector 26 via electric wire 98. That signal controls the duration of the injector opening, and the timing of the signal determines the timing of the injection. The injected water quantity is controlled by sending a control signal to water injector 25 via electric wire 99. That signal controls the duration of the injector opening, and the timing of the signal determines the timing of the injection. The temperature of gas flowing into intake manifold 32 (FIG. 1) and the quantity of water removed from that gas is controlled by a signal sent to control valve 74 via electric wire 100. This controls the flow of cooling fluid through gas cooler 38 and varies the amount of heat absorbed from the gas by the cooling fluid. The pressure of gas flowing into intake manifold 32 (FIG. 1) is controlled by a signal sent to pressure-control valve 52 via electric wire 94 That varies the variable restriction incorporated into pressure-control valve 52 and controls the flow of gas discharged into outside atmosphere. This controls the pressure in exhaust manifold 44, and since intake manifold 32 is directly connected to exhaust manifold 44 via gas cooler 38, it indirectly controls the pressure of the gas flowing into intake manifold 32.

The engine of the present invention does not require a turbocharger or a supercharger for boosted operation. It is inherently self-supercharging. Increasing restriction to flow through pressure-control valve 52 (FIG. 1) increases pressure of combustion gas recycled back into intake manifold 32 (FIG. 1). There is less pressure blowdown at the end of the second volume-increasing stroke and more cooling is required in gas cooler 38 (FIG. 1), but the net result is a greater mass of gas flowing into cylinder chamber 16 (FIG. 1). There is no shortage of gas, since the mass of gas exiting cylinder chamber 16 is always greater than the mass of gas entering that chamber. The quantity of injected fuel and oxygen can be adjusted independently of recycled gas control. Elimination of a turbocharger or a supercharger is a substantial reduction in cost.

In the above description of the engine operation that was referenced to FIGS. 1 and 2, three fluids, oxygen, water and fuel, are added to the recycled gas after induction of that gas into the engine cylinders. In other cases, some or all of the above three fluids can be added to the recycled gas before that gas is inducted into the engine cylinders. FIG. 3 illustrates a case, in which all three above fluids are injected into intake manifold 132. Oxygen flows from oxygen-supply system 160 to oxygen injector 126 through oxygen-supply line 162. Water flows from water container 161 to water injector 125 through water-supply line 159. Fuel flows from fuel-supply system 156 to fuel injector 124 through fuel line 158.

In another case, two of the above fluids may be added to the recycled gas before that gas is inducted into the engine cylinders, while the third fluid is injected into the engine cylinder. For example, oxygen and water can be added to the recycled gas before that gas is inducted into the engine cylinders, while fuel is injected into the engine cylinders or, in another example, oxygen and fuel can be added to the recycled gas before that gas is inducted into the engine cylinders, while water is injected into the engine cylinders or, in still another example, water and fuel can be added to the recycled gas before that gas is inducted into the engine cylinders, while oxygen is injected into the engine cylinders.

In still another case, one of the above fluids may be added to the recycled gas before that gas is inducted into the engine cylinders, while the two other fluids are injected into the engine cylinders. For example, oxygen can be added to the recycled gas before that gas is inducted into the engine cylinders, while water and fuel are injected into the engine cylinders or, in another example, water can be added to the recycled gas before that gas is inducted into the engine cylinders, while oxygen and fuel are injected into the engine cylinders or, in still another example, fuel can be added to the recycled gas before that gas is inducted into the engine cylinders, while oxygen and water are injected into the engine cylinders.

Combustion gas that flows from the engine into the gas cooler carries a substantial amount of energy that can be used to improve the engine efficiency. Some of that energy can be used to produce electric power. This is illustrated in FIG. 4A. In engine 210 (FIG. 4), hot combustion gas flowing out from an exhaust manifold 244 through a pipe 246 is diverted into a turbo-generator that includes a gas turbine 214 coupled, via a shaft 215, to an electric generator 216 that is connected to an electric battery 218 via an electric wire 220. From gas turbine 214 the gas flows into a gas cooler 238 via a pipe 222 and an inlet 248. In all other respects, engine 210 is identical to engine 10 (FIG. 1). Electric power produced by electric generator 216 and stored in electric battery 218 can be used to power various engine accessories and auxiliary devices such as pumps, injectors, blowers, air conditioning, steering, brakes, etc., while the engine power is used to perform its main function such as, for example, vehicle propulsion or powering an electric grid. This improves the overall system fuel economy FIG. 4B illustrates a case, in which some of the combustion gas energy is used to heat the water that is to be injected into the recycled combustion gas. In engine 810, hot combustion gas flowing out from an exhaust manifold 844 through a pipe 846 is diverted to water container 861, passes through heating jacket 863 and flows into a gas cooler 838 via a pipe 822 and an inlet 848. In all other respects, engine 810 is identical to engine 10 (FIG. 1).

FIG. 4C illustrates another case, in which some of the combustion gas energy is used to heat the water that is to be injected into the recycled combustion gas, and some of the gas energy is used to convert some of that water into a superheated steam for its subsequent injection into the engine cylinder. In engine 910, hot combustion gas flowing out from an exhaust manifold 944 through a pipe 946 is diverted to a superheater 965, passes through heating jacket 967, flows through pipe 971, passes through heating jacket 963 and flows into a gas cooler 938 via a pipe 922 and an inlet 948. Hot gas passing through heating jacket 963 heats and boils the water in water container 961. Saturated steam accumulates in the upper part of water container 961, while water remains in the lower part of that container. Hot pressurized water flows from water container 961 through pipe 959 to water injector 925 and is injected into cylinder chamber 916 during the first volume-decreasing stroke. Saturated steam flows from water container 961 through pipe 969 into superheater 965, where it is further heated and converts into a superheated steam. The superheated steam flows from superheater 965 through pipe 973 to steam injector 927 and is injected into cylinder chamber 916 during the second volume-increasing stroke. In all other respects, engine 910 is identical to engine 10 (FIG. 1).

2. Split-Cycle Engine

Engine 310 (FIG. 5) operates in a gas-recycling mode that requires no air induction into the engine. Most of the combustion gas expelled from the engine, at the end of each cycle, flows into gas cooler 338 via pipe 446. There, the gas is cooled, and at least some of its water vapor is condensed into liquid water that flows into water collector 365 via condensate pipe 363. Water pump 367 receives water from water collector 365 through low-pressure water line 369 and pumps it, under pressure, into water container 361. Pressurized water flows from water pump 367 through high-pressure water line 371, overflow valve 373 and high-pressure water line 375 into water container 361. Excess water returns from overflow valve 373, through return line 379, back into water collector 365.

Compressor cylinder 312 inducts cooled combustion gas from gas cooler 338 into compressor chamber 316 during piston 314 volume-increasing stroke, when piston 314 moves away from cylinder head 318. During the volume-increasing stroke, intake valve 320 is open while outlet valve 322 is closed, and gas flows from gas cooler 338 through outlet 336, pipe 334, intake manifold 332, intake passage 330, intake port 328 and intake valve 320 into compressor chamber 316. During a first part of the subsequent volume-decreasing stroke, when piston 314 moves towards cylinder head 318, both intake valve 320 and outlet valve 322 are closed and the gas inside compressor chamber 316 is compressed. Oxygen and water are injected through oxygen injector 326 and through water injector 325, respectively, into compressor chamber 316 during the early part of the volume-decreasing stroke. In some other cases, water or oxygen, or both may be injected during the volume-increasing stroke. Oxygen is supplied to oxygen injector 326 from oxygen-supply system 360 via oxygen-supply line 362. Pressurized water is supplied to water injector 325 from water container 361 via water-supply line 359.

During the volume-decreasing stroke, water injected into compressor chamber 316 evaporates. Water evaporation absorbs the heat produced in compression and restricts the pressure and temperature rise. As long as there is liquid water in compressor chamber 316, the temperature of gas in that chamber is determined by the temperature of the boiling point of water. Thus the compression of gas takes place at near-constant temperature.

As piston 314 approaches its top-dead-center position (TDC), outlet valve 322 opens and compressed gas is transferred into transfer manifold 342 during a second part of the volume-decreasing stroke. The gas flows from compressor chamber 316 through outlet valve 322 and outlet port 340 into transfer manifold 342. Then, outlet valve 322 closes, intake valve 320 opens and the above two-stroke compression cycle is repeated again during the next engine revolution.

Expander cylinder 412 is charged with compressed combustion gas from transfer manifold 342 during a second part of the volume-decreasing stroke. At that time, inlet valve 420 is open, and the gas flows from transfer manifold 342 through inlet port 428 and inlet valve 420 into expander chamber 416. Then, inlet valve 420 closes and fuel is injected into cylinder chamber 416 through fuel injector 424. Fuel is supplied to fuel injector 424 from fuel-supply system 456 via fuel-supply line 458. Ignition takes place shortly before piston 414 approaches its top-dead-center position (TDC). Compression ignition is the preferred method of ignition, but other means for assisting or inducing the ignition, such as glow plugs and spark plugs, can be used too.

Combustion is completed during early part of a volume-increasing stroke and the combustible mixture turns into a high-pressure hot combustion gas. Water is injected into expander chamber 416 during the early part of the volume-increasing stroke and turns into superheated steam. Pressurized water is supplied to water injector 425 from water container 361 via water-supply line 459. During the remaining part of that stroke, expanding combustion gas and high-pressure steam perform mechanical work on piston 414. As piston 414 approaches its bottom-dead-center position (BDC), exhaust valve 422 opens, and pressure in expander chamber 416 drops to the level of pressure in exhaust manifold 444.

During a first part of the volume-decreasing stroke, exhaust valve 422 is open while inlet valve 420 is closed, and hot combustion gas and steam are expelled from expander chamber 416 and flow into gas cooler 338. The gas flows from expander chamber 416 through exhaust valve 422, exhaust port 440, exhaust passage 442, exhaust manifold 444, pipe 446 and inlet 348 into gas cooler 338. A small fraction of the gas is discharged from exhaust manifold 444 through passage 450 and pressure-control valve 452 into exhaust pipe 454 that is connected to outside atmosphere.

The mass of gas inducted into compressor chamber 316, via intake manifold 332, must be equal to the mass displaced into gas cooler 338 from exhaust manifold 444, less water removed from the gas. The mass of gas discharged from expander chamber 416 into exhaust manifold 444 is equal to the mass inducted into compressor chamber 316 plus the mass of oxygen, water and fuel injected. The mass of water injected into the gas in compressor chamber 316 and into expander chamber 416 is equal to the mass of water vapor that was previously removed from that gas in gas cooler 338. Therefore, on average, the mass of gas discharged through pressure-control valve 452 is equal to the mass of fuel and oxygen injected into the engine cylinders, and the rest of the gas flows into gas cooler 338. If the area of the controllable restriction incorporated into pressure-control valve 452 is decreased or increased, the flow of gas through pressure-control valve 452 temporarily decreases or increases, respectively, and the pressure of gas in exhaust manifold 444 increases or decreases, respectively, until the proper flow through pressure-control valve 452 is restored. In that way, pressure of gas flowing into compressor chamber 316 can be controlled. Controlling the pressure of the recycled gas controls the mass of gas inducted into the engine.

Inside gas cooler 338, hot combustion gas comes into contact with a multitude of cooling pipes 361 and looses a substantial portion of its heat to cooling fluid flowing inside cooling pipes 361. When the temperature of gas drops to the temperature of the dew point for water, water vapor begins to condense into liquid water. Some of that water forms a fine mist of tiny droplets carried by the gas, but most of it precipitates and condenses on the surfaces of cooling pipes 361 and on the inner walls of gas cooler 338. That water drips to the bottom of gas cooler 338 and flows into water collector 365 through condensate pipe 363. The amount of water produced depends on the amount of heat taken out of the gas flowing through gas cooler 338, which can be controlled by controlling the flow of cooling fluid through cooling pipes 361. Control valve 374 controls that flow. If sufficient amount of heat is taken out of the gas, all of its water vapor is condensed and removed, and the remaining gas consists almost entirely of carbon dioxide. In other cases, some water vapor may still remain in that gas. Adding oxygen to that gas turns it into "artificial air", which is a gaseous mixture of carbon dioxide and oxygen and is used by the engine instead of atmospheric air. Cooled gas exits gas cooler 338 through outlet 336 and flows back into the engine, where the above cycle is repeatedly performed in all engine cylinders.

Heat-rejection system 368 pumps cooling fluid through gas cooler 338. The cooling fluid absorbs heat from combustion gas in gas cooler 338 and rejects that heat to outside environment in heat-rejection system 368. Cooling fluid flows from heat-rejection system 368 through control valve 374, pipe 372, inlet chamber 364 and multitude of cooling pipes 361 into outlet chamber 366. From there, it returns to heat-rejection system 368 via pipe 370. Operation of heat-rejection system 368 can be similar to operation of a conventional engine cooling system, which usually includes an air blower blowing atmospheric air through a radiator that carries the cooling fluid. In most cases, heat-rejection system 368 may be integrated with the rest of the engine cooling system.

Control of the engine operation is illustrated in FIG. 6. Control system 382 is an on-board computer programmed to control operation of various components of the engine in accordance with a strategy program incorporated into its software. The software contains algorithms and data that permit the control system to evaluate the stream of input signals and determine the magnitude and the timing of each output signal. The output signals control operation of the engine and its components and are updated at least once every engine cycle.

Control system 382 receives a control signal via electric wire 386 from control implement 384, which specifies the engine operator's demand for a specific engine power and speed. The control system evaluates the received information and, in accordance with its internal logic, controls operation of the engine and its components, so as to satisfy the operator's demands while maintaining optimum fuel consumption efficiency and minimum exhaust emissions. Control system 382 also receives input signals from intake manifold temperature and pressure sensors 376 and 378, respectively, to which it is connected via electric wires 388 and 390, respectively. It also receives input signals from engine speed sensor (not shown) and from cylinder pressure sensors 477 via electric wire 481.

Control system 382 controls operation of engine 310 (FIG. 5) by varying the quantity of fuel, water and oxygen injected into the chambers 316 and 416 during each cycle. It also controls the pressure and temperature of the recycled combustion gas flowing back into the engine. The injected fuel quantity is controlled by sending a control signal to fuel injector 424 via electric wire 496. That signal controls the duration of the injector opening, and the timing of the signal determines the timing of the injection. The injected oxygen quantity is controlled by sending a control signal to oxygen injector 326 via electric wire 398. That signal controls the duration of the injector opening, and the timing of the signal determines the timing of the injection. The injected water quantity is controlled by sending control signals to water injectors 325 and 425 via electric wires 399 and 499, respectively. Those signals control the duration of each injector opening, and the timing of each signal determines the timing of the injection. The temperature of gas flowing into intake manifold 332 (FIG. 5) and the quantity of water removed from that gas is controlled by a signal sent to control valve 374 via electric wire 400. This controls the flow of cooling fluid through gas cooler 338 and varies the amount of heat absorbed from the gas by the cooling fluid. The pressure of gas flowing into intake manifold 332 (FIG. 5) is controlled by a signal sent to pressure-control valve 452 via electric wire 494 That varies the variable restriction incorporated into pressure-control valve 452 and controls the flow of gas discharged into outside atmosphere. This controls the pressure in exhaust manifold 444, and since intake manifold 332 is directly connected to exhaust manifold 444 via gas cooler 338, it indirectly controls the pressure of the gas flowing into intake manifold 332.

The engine of the present invention does not require a turbocharger or a supercharger for boosted operation. It is inherently self-supercharging. Increasing the restriction to flow through pressure-control valve 452 (FIG. 5) increases pressure of combustion gas recycled back into intake manifold 332 (FIG. 5). There is less pressure blowdown at the end of the volume-increasing stroke in expander cylinder 412 and more cooling is required in gas cooler 338 (FIG. 5), but the net result is a greater mass of gas flowing into compressor chamber 316 (FIG. 5). There is no shortage of gas, since the mass of gas exiting expander chamber 416 is always greater than the mass of gas entering compressor chamber 316. The quantity of injected fuel and oxygen can be adjusted independently of recycled gas control. Elimination of a turbocharger or a supercharger is a substantial reduction in cost.

In the above description of the engine operation that was referenced to FIGS. 5 and 6, three fluids, oxygen, water and fuel, are added to the recycled gas after induction of that gas into the engine cylinders. In other cases, some or all of the above three fluids can be added to the recycled gas before that gas is inducted into the engine cylinders. FIG. 7 illustrates a case, in which oxygen and water are injected into intake manifold 532, and fuel and water are injected into transfer manifold 542. Oxygen flows from oxygen-supply system 560 to oxygen injector 526 through oxygen-supply line 562. Water flows from water container 561 to water injector 525 through water-supply line 559. Fuel flows from fuel-supply system 656 to fuel injector 624 through fuel line 658. Water flows from water container 561 to water injector 625 through water-supply line 659.

In another case, two of the above fluids may be added to the recycled gas before that gas is inducted into the engine cylinders, while the third fluid is injected into the engine cylinder. For example, oxygen and water can be added to the recycled gas before that gas is inducted into the engine cylinders, while fuel is injected into the engine cylinders or, in another example, oxygen and fuel can be added to the recycled gas before that gas is inducted into the engine cylinders, while water is injected into the engine cylinders or, in still another example, water and fuel can be added to the recycled gas before that gas is inducted into the engine cylinders, while oxygen is injected into the engine cylinders.

In still another case, one of the above fluids may be added to the recycled gas before that gas is inducted into the engine cylinders, while the two other fluids are injected into the engine cylinders. For example, oxygen can be added to the recycled gas before that gas is inducted into the engine cylinders, while water and fuel are injected into the engine cylinders or, in another example, water can be added to the recycled gas before that gas is inducted into the engine cylinders, while oxygen and fuel are injected into the engine cylinders or, in still another example, fuel can be added to the recycled gas before that gas is inducted into the engine cylinders, while oxygen and water are injected into the engine cylinders.

Combustion gas that flows from the engine into the gas cooler carries a substantial amount of energy that can be used to improve the engine efficiency. Some of that energy can be used to produce electric power. This is illustrated in FIG. 8A. In engine 610 (FIG. 8A), hot combustion gas flowing out from an exhaust manifold 744 through a pipe 746 is diverted into a turbo-generator that includes a gas turbine 714 coupled, via a shaft 715, to an electric generator 716 that is connected to an electric battery 718 via an electric wire 720. From gas turbine 714 the gas flows into a gas cooler 738 via a pipe 722 and an inlet 748. In all other respects, engine 610 is identical to engine 310 (FIG. 5). Electric power produced by electric generator 716 and stored in electric battery 718 can be used to power various engine accessories and auxiliary devices such as pumps, injectors, blowers, air conditioning, steering, brakes, etc, while the engine power is used to perform its main function such as, for example, vehicle propulsion or powering an electric grid. This improves the overall system fuel economy FIG. 8B illustrates a case, in which some of the combustion gas energy is used to heat the water that is to be injected into the recycled combustion gas. In engine 1010, hot combustion gas flowing out from an exhaust manifold 1044 through a pipe 1046 is diverted to water container 1061, passes through heating jacket 1063 and flows into a gas cooler 1038 via a pipe 1022 and an inlet 1048. In all other respects, engine 1010 is identical to engine 310 (FIG. 5).

FIG. 8C illustrates another case, in which some of the combustion gas energy is used to heat the water that is to be injected into the recycled combustion gas, and some of the gas energy is used to convert some of that water into a superheated steam for its subsequent injection into the engine cylinder. In engine 1110, hot combustion gas flowing out from an exhaust manifold 1144 through a pipe 1146 is diverted to superheater 1165, passes through heating jacket 1167, flows through pipe 1171, passes through heating jacket 1163 and flows into a gas cooler 1138 via a pipe 1122 and an inlet 1148. Hot gas passing through heating jacket 1163 heats and boils the water in water container 1161. Saturated steam accumulates in the upper part of water container 1161, while water remains in the lower part of that container. Hot pressurized water flows from water container 1161 through pipe 1159 to water injector 1125 and is injected into compressor chamber 1116 during the volume-decreasing stroke in compressor cylinder 1112. Saturated steam flows from water container 1161 through pipe 1169 into superheater 1165, where it is further heated and converts into superheated steam. The superheated steam flows from superheater 1165 through pipe 1173 to steam injector 1127 and is injected into expander chamber 1216 during the volume-increasing stroke in expander cylinder 1212. In all other respects, engine 1110 is identical to engine 310 (FIG. 5).

3. On-Site Oxygen Production

Oxygen required for the engine operation can be produced in an on-site/on-board installation.

FIG. 9 is a schematic diagram illustrating a system for extracting oxygen out of atmospheric air and for using the remaining nitrogen and argon for combustion gas cooling. Oxygen is separated from other components of air in a process called fractional distillation. Fractional distillation of air is a well known industrial process that takes advantage of the fact that the boiling point of oxygen is at higher temperature than the boiling points of other air components. This permits condensing oxygen into its liquid form and separating it from other air components that remain in gaseous state.

Atmospheric air enters a distillation chamber 1314 (FIG. 9) through an air inlet 1316 and is subjected to the fractional distillation process. The air is cooled until its temperature drops to the boiling point for oxygen. At that point, oxygen condensation begins. Liquid oxygen accumulates in the lower part of distillation chamber 1314, while gaseous nitrogen and argon occupy its upper part. Liquid oxygen flows out from distillation chamber 1314 through a pipe 1318 and accumulates in an oxygen collector 1320, which can serve as a source of oxygen for an engine 1310. Gaseous nitrogen and argon flow out of distillation chamber 1314 through an outlet 1322 and flow through a pipe 1324 and an inlet 1326 into an inlet chamber 1328, which is part of a gas cooler 1338. Inside gas cooler 1338, nitrogen and argon flow from inlet chamber 1328 through pipes 1361 into an outlet chamber 1330 and, from there, through an outlet 1332 into outside atmosphere (sometimes, they may be collected and stored).

Hot combustion gas flows from engine 1310 through a pipe 1334 and an inlet 1336 into interior of gas cooler 1338. There, the combustion gas is cooled by cold gases flowing inside pipes 1361. Then, it flows out from gas cooler 1338 and into a gas cooler 1438 through an outlet 1348, a pipe1340 and an inlet 1448. There, the combustion gas is further cooled and water vapor is condensed. Water flows out through a condensate pipe 1463 and accumulates in a water collector 1465 Gas cooler 1438 is very similar to previously described gas cooler 38 (FIG. 1), and it uses water-based engine coolant for combustion gas cooling. From gas cooler 1438, cooled combustion gas flows through an outlet 1436 and pipe 1434 to the intake of engine 1310.

ADVANTAGES OF GAS AND WATER RECYCLING

A Summary

The engine of the present invention receives no air from outside atmosphere. Instead, combustion gas expelled from the engine is cooled and recycled back into the engine. That gas contains no nitrogen and consists mostly of carbon dioxide and water vapor. When oxygen is added to such gas, it forms a kind of "artificial air" that can be used for combustion in the engine. Cooling that gas condenses its water vapor, and liquid water is separated from the gas and collected in a water container. Oxygen, water and fuel are added to the recycled gas, and the resulting mixture is used to perform an internal-combustion cycle. A small amount of the expelled combustion gas is discharged into outside environment, and the rest is recycled. Water too is recycled back into the engine, and the small amount that is lost to outside environment is replaced by reclaiming water produced in hydrocarbon fuel combustion. No additional supply of water is needed. Such engine can achieve very substantial improvements in exhaust emissions and fuel efficiency. A brief summary of the advantages of gas and water recycling is given below.

1. Complete Elimination of Nitrogen Oxides

Since no atmospheric air is inducted into the engine, the gas that participates in combustion contains no nitrogen. As a result, no nitrogen oxides are produced, and the engine has zero nitrogen oxides emission. This resolves one of the most insidious problems associated with internal combustion engine operation. It also leads to a very substantial reduction in costs, since it eliminates the need for the very expensive systems that are presently used to control nitrogen oxides emissions.

2. Reduction in Exhaust Emissions

In the engine of the present invention, the amount of harmful exhaust emissions, including particulate matter, unburned hydrocarbons and carbon monoxide, is greatly reduced. Most of the combustion gas expelled from each engine cylinder, after each cycle, is recycled back into the engine intake. Only a small fraction of that gas is exhausted into the exhaust pipe and, from there, into outside environment. On average, the mass of gas exhausted into the environment is equal to the mass of fuel and oxygen added to the recycled combustion gas.

For a typical hydrocarbon fuel, such as gasoline or diesel, 3.4 gram of oxygen is needed to burn one gram of fuel. Hence, for each gram of fuel burned in the engine of the present invention, 4.4 gram of gas is exhausted into outside environment. In a compression ignition engine, air-to-fuel ratio may vary from 20:1, at full-load, to 80:1 at light-load, and the mass of combustion gas per each gram of fuel may vary from 21 to 81 grams, respectively. Since the mass of gas exhausted into the environment remains fixed at 4.4 gram per gram of fuel, the percentage of combustion gas recycled back into the engine varies from 80%, at full-load, to 95% at light-load. Hence an average particle of combustion gas is recycled through the engine many times before it is exhausted into outside environment.

The recycled combustion gas caries back into the engine all the unburned hydrocarbons, particulate matter and carbon monoxide it contains. The key to reduction in those emissions is in repeatedly subjecting the same gas to the fires of combustion in the engine. Since most of the combustion gas is recycled back into the engine cylinders over-and-over again, an average particle of gas goes through the combustion process many times. In such operation, whatever did not burn the first time is repeatedly returned to the combustion chamber and is burned there. In that way, between 80 and 95% of harmful emissions produced in combustion are eliminated before they reach the engine exhaust pipe. The remaining 5 to 20% of emissions may be treated in a catalyst incorporated in the exhaust pipe. With noble metal catalyst efficiency approaching 90%, as much as 99% of harmful emissions produced in the combustion chambers can be eliminated. Also, a much smaller catalytic converter and much less noble metal are needed. This is a substantial reduction in costs.

3. Reduction in Compression Work

Heat generated by burning fuel is used by the engine to perform useful mechanical work. The engine efficiency is measured by a ratio of mechanical work to the amount of heat energy used to perform that work. Net work performed by the engine is equal to the positive work performed during gas expansion less the negative work performed during gas compression. Reduction in compression work and/or increase in expansion work, at given heat energy consumption, improve the engine efficiency.

During gas compression, some of the compression work performed goes into heating up the gas. Science teaches us that the efficiency of gas compression improves if less energy goes into gas heating. The most efficient gas-compression process is isothermal compression. Isothermal compression is gas compression at constant temperature. Adding liquid water to the recycled combustion gas can achieve gas compression at nearly-constant temperature. Water evaporation absorbs heat produced in gas compression and, as long as there is liquid water in the gas, the gas temperature is determined by the temperature of the boiling point of water. The boiling point of water increases with increase in pressure, but it is not a significant increase. Therefore, as long as water evaporation proceeds, a near-isothermal compression of the gas takes place. Heating the water to a temperature that is close to its boiling point, before it is added to the gas, facilitates faster water evaporation. In that way, a very substantial reduction in compression work is achieved. There is also an additional benefit: Compressing the gas without a significant increase in its temperature permits a substantial increase in the engine compression ratio and a corresponding increase in gas-expansion ratio during the subsequent gas-expansion stroke. Greater gas expansion further improves the engine efficiency.

The preferred method of adding water to the gas is by injecting water directly into the engine cylinder. The engine control system controls the timing, quantity and rate of water injection to optimize the positive effect on the engine efficiency.

4. Increase in Expansion Work

Water injection into the engine cylinders, during the power stroke, can contribute to an increase in the gas-expansion work. Inside the combustion chamber, water converts into steam that expands and performs work that supplements work performed by the combustion gas. The efficiency of that process is enhanced if heat of the hot recycled gas is used to heat pressurized water before it is injected. In that case, the water injected into the cylinder is superheated water. Superheated water is water under high pressure that keeps it in liquid state at temperatures exceeding the usual boiling point at atmospheric pressure. When injected into a lower pressure gas in the combustion chamber, the superheated water converts into steam that performs additional work on the piston. In that way, some of the energy contained in the hot recycled gas can be reclaimed.

In another alternative, heat of the hot recycled gas can be used to convert water into superheated steam that is injected directly into the combustion chamber. In that way, even greater proportion of the recycled gas energy can be reclaimed. Superheated steam is steam at temperature that is higher than the boiling point of water.

The engine control system controls the timing, quantity and rate of water or steam injection to optimize the positive effect on the engine efficiency.

5. Reduction in Engine Size

The engine of the present invention can be considerably smaller than a conventional air-breathing engine with the same power capacity. This is because carbon dioxide, which is the main ingredient in the recycled combustion gas of the airless engine, is much heavier than nitrogen, which is the main ingredient in the intake air of a conventional air-breathing engine. Therefore, a smaller engine cylinder can receive the same mass of gas as a larger cylinder in a conventional engine using air at the same pressure and temperature. Direct injection of oxygen, fuel and water into the engine cylinder, after the intake valve closure, contributes to further reduction in engine size, since the cylinder becomes completely filled with recycled gas before oxygen, fuel and water are added. This increases the total mass of gas participating in combustion and permits a reduction in the size of the cylinder.

In a conventional engine that uses air inducted from outside atmosphere, exhaust gas contains about 6% of water. In contrast to that, in the engine of the present invention, the exhaust gas contains about 29% of water. Therefore the recycled combustion gas is rich in water vapor. If all that water vapor is condensed and separated from the recycled gas, the remaining gas that fills the engine cylinder consists almost entirely of carbon dioxide. Carbon dioxide is about 50% heavier than air, and if the water and oxygen are added to that gas in the cylinder after the intake valve closure, the total mass of matter trapped in that cylinder is at least twice the mass of air that can be inducted at equal pressure into an equal-size cylinder in a conventional engine. Hence, the engine of the present invention can be about twice smaller than a conventional engine of comparable power. Such reduction in engine size is especially valuable in transportation vehicles, where it offers the advantage of lower weight and better packaging.

6. Reduction in Friction Work

Work of friction in internal-combustion engine is approximately proportional to the engine size. For reasons listed above, the engine of the present invention can be substantially smaller than a conventional air-breathing engine. A smaller engine has much less friction and hence a much better fuel economy.

7. Inherent Supercharging

The engine of the present invention does not require a turbocharger or a supercharger for boosted operation. It is inherently self-supercharging. Increasing restriction to flow through a pressure-control valve increases pressure of combustion gas recycled back into intake manifold and supercharges the engine. Elimination of the need for expensive turbochargers or superchargers is a significant reduction in costs.

8. No need for Additional Water Supply

Thanks to gas and water recycling, the engine of the present invention offers much more favorable conditions for application of in-cylinder water injection than a conventional engine does. The composition of gas inducted into the engine of the present invention is very different from that inducted into a conventional engine. A conventional engine inducts atmospheric air, in which nitrogen is the main ingredient. In that engine, nitrogen remains the main component of its exhaust gas, which contains very little water vapor. In contrast to that, the engine of the present invention inducts recycled combustion gas, in which nitrogen is replaced by carbon dioxide and water vapor. That gas contains about 29% of water vapor. That is a sufficient amount of water vapor to justify condensing it and injecting liquid water into the recycled gas at a later time. Later, most of that water flows back into the engine as a water vapor fraction of the recycled gas. Whatever is lost to outside environment is replaced by water produced in combustion. Thus the engine can use large amount of water, with most of that water being continuously recycled.

Thanks to water recycling, the engine of the present invention is self-sufficient in terms of it water consumption. No additional supply of water is needed, regardless of how much water is used in each engine cycle, and there is no need for an on-board tank with water.

CONCLUSION, RAMIFICATIONS AND SCOPE

The method and the system of the present invention can substantially improve internal-combustion engine exhaust emissions, fuel economy and performance, while reducing the engine size.

Since no air is inducted into the engine, no nitrogen takes part in the combustion process. The combustion gas recycled back into the engine consists mostly of carbon dioxide and water vapor. Since no nitrogen is present, no nitrogen oxides are produced. This removes one of the most significant deficiencies of internal-combustion engines, which, in their conventional incarnations, are prodigious producers of nitrogen oxides.

Another drawback of internal-combustion engines is unburned hydrocarbons and particulate matter emission and this is greatly reduced too. Since most of the combustion gas is recycled back into the engine cylinders over-and-over again, an average particle of gas goes through the combustion process many times before it is discharged into outside environment. In such operation, most of the unburned hydrocarbons and particulate matter are repeatedly returned to the combustion chamber and are burned there. This removes the second major deficiency of internal-combustion engines.

The engine of the present invention can be considerably smaller than a conventional air-breathing engine with the same power capacity. This is because carbon dioxide, which is the main ingredient in the recycled combustion gas of the above described engine, is much heavier than nitrogen, which is the main ingredient in the intake air of a conventional engine. Therefore, a smaller engine cylinder can receive the same mass of gas as a larger cylinder in a conventional engine using air at the same pressure and temperature. Direct injection of oxygen and water into the engine cylinder, after the intake valve closure, contributes to further reduction in engine size, since the cylinder becomes completely filled with recycled gas before oxygen and water are added. This increases the total mass of gas participating in combustion and permits a reduction in the size of the cylinder. Because of that, the engine of the present invention can be about twice smaller than a conventional engine of comparable power. A smaller engine has less friction and a much better fuel economy.

The engine of the present invention does not require a turbocharger or a supercharger for boosted operation. It is inherently self-supercharging. Elimination of a turbocharger or a supercharger is a substantial reduction in cost.

Complete elimination of nitrogen oxides coupled with a very substantial reduction in emission of particulate matter and other harmful pollutants, and a reduction in engine size without a need for a turbocharger or a supercharger makes the system and the method of the present invention very attractive for diesel engines. Diesel engines have a much better fuel economy than spark ignition engines that currently dominate passenger car fleet in this country. Increasing their acceptability in the market place can make a substantial contribution to reduced foreign oil import and to a reduction in carbon dioxide emission on a national scale.

Although the description above contains much specificity, this should not be construed as limiting the scope of the invention, but as merely providing illustrations of some of the presently preferred embodiments of this invention. For example, it was assumed that the above described engine uses a hydrocarbon fuel. However, the concept of the present invention also applies to engines that use hydrogen as fuel. In that case, the recycled exhaust gas is mostly water vapor.

The preferred arrangement illustrated in FIG. 1 anticipates that pressure of gas flowing into intake manifold 32 is controlled by controlling pressure-control valve 52. In some other cases, the pressure control system may also include a controllable throttle valve installed at the inlet to intake manifold 32 or at the inlet to gas cooler 38. This broadens the range of gas-pressure control to include pressures that are lower than atmospheric pressure. Also, description of the on-site oxygen production shown in FIG. 9 anticipates oxygen production by cryogenic means. Other methods of oxygen production can be used too. Also, FIG. 9 and the associated description anticipate that cooling the combustion gas in a gas cooler using cold gases (nitrogen and argon) as cooling media precedes cooling it in a gas cooler using engine coolant. In some other cases, cooling with engine coolant may precede cooling with cold gases.

Thus the scope of the invention should be determined by the appended claims and their legal equivalents, rather than by the examples given.

I claim:

1. A method for operating an internal-combustion engine, said method comprising the steps of:
    (a) providing an internal-combustion engine that uses recycled combustion gas and oxygen instead of air, said engine including:
        (1) at least one cylinder,
        (2) a cylinder chamber within said at least one cylinder,
        (3) a head mounted to said at least one cylinder, and
        (4) a piston that can reciprocate in said at least one cylinder, with the piston to head and cylinder relationship being such that the volume of said cylinder chamber shrinks during a volume-decreasing stroke, when said piston moves towards said head, and expands during a volume-increasing stroke, when said piston moves away from said head,
    (b) providing a gas-cooling means for receiving, cooling and discharge of said engine combustion gas and for condensing water vapor contained in said combustion gas,
    (c) providing a collecting means for collecting water condensed in said gas-cooling means,
    (d) providing a gas-intake means for selectively connecting said engine to said gas-cooling means and for receiving cooled combustion gas from said gas-cooling means into said engine,
    (e) providing a means for adding water from said collecting means to said combustion gas,
    (f) providing a source of oxygen and an oxygen-delivery means for adding oxygen to said combustion gas,
    (g) providing a source of fuel and a fuel-delivery means for adding fuel to said combustion gas,
    (h) providing a gas-exhaust means for selectively connecting said engine to said gas-cooling means and for discharging hot combustion gas from said engine into said gas-cooling means,
    (i) providing a pressure-control means for controlling the pressure of said recycled combustion gas and for discharging excess combustion gas into outside atmosphere,
    (j) providing a control means for controlling the operation of said internal-combustion engine in response to operator's demands and in accordance with a control program incorporated in said control means,
    (k) operating said engine in a gas-recycling mode by repeatedly performing an engine cycle that includes the steps of
        (1) cooling hot combustion gas and condensing water vapor contained in said hot combustion gas in said gas-cooling means, whereby said hot combustion gas turns into cooled combustion gas and said water vapor turns into water,
        (2) collecting water condensed in said gas-cooling means into said collecting means,
        (3) adding water from said collecting means to said combustion gas,
        (4) receiving said cooled combustion gas from said gas-cooling means into said engine,
        (5) adding oxygen and fuel to said combustion gas, whereby a combustible mixture forms,
        (6) using said combustible mixture to perform an internal-combustion cycle in said engine,
        (7) discharging hot combustion gas from said engine into said gas-cooling means, and
        (8) discharging excess combustion gas through said pressure-control means into outside atmosphere, and
    (l) using said control means for control of operation of said internal-combustion engine,
    whereby said engine operates without receiving air from outside atmosphere,
    whereby said combustible mixture contains no nitrogen,
    whereby no nitrogen oxides are produced in said engine,
    whereby harmful exhaust emissions are recycled back into said engine and burned there,
    whereby water evaporation in said engine reduces said engine fuel consumption,
    whereby recycling water produced in combustion eliminates the need for additional source of water, whereby there is no need for an on-board tank of water, and whereby there are substantial improvements in said engine fuel economy and exhaust emissions.

2. The method of claim 1 wherein said engine is a four-stroke engine and said internal-combustion cycle includes the step of compressing said combustion gas in said cylinder chamber and evaporating said water during a first volume-decreasing stroke,
- whereby evaporation of said water absorbs heat produced in compression of said combustion gas,
- whereby the temperature of said combustion gas, during said water evaporation, is determined by the temperature of the boiling point of water,
- whereby a near-isothermal compression of said combustion gas takes place during said water evaporation,
- whereby the temperature of said combustion gas, at the end of said first volume-decreasing stroke, is lower than it would be if no water was added to said combustion gas,
- whereby it takes less energy to compress said combustion gas, and
- whereby engine compression ratio can be increased.

3. The method of claim 2 further including the steps of providing a water-heating means for heating said water and using heat of said hot combustion gas for heating said water in said water-heating means before it is added to said cooled combustion gas, whereby faster water evaporation is achieved during said first volume decreasing stroke.

4. The method of claim 1 wherein said engine is a four-stroke engine and said internal-combustion cycle includes the step of adding said water from said collecting means into said cylinder chamber during a second volume-increasing stroke,
- whereby heat of combustion turns said water into high-pressure steam that expands during said second volume-increasing stroke and performs work on said piston,
- whereby work performed by said high-pressure steam supplements work performed by said hot combustion gas, and whereby said engine fuel consumption is reduced.

5. The method of claim 4 further including the steps of providing a water-heating means for heating said water and using heat of said hot combustion gas for heating said water in said water-heating means before said water is added into said cylinder chamber during said second volume-increasing stroke, whereby said water brings more heat into said cylinder chamber, and whereby said engine fuel consumption is further reduced.

6. The method of claim 1 further including the steps of
(a) providing a superheater means for converting said water into a superheated steam,
(b) using heat of said hot combustion gas to convert said water into a superheated steam in said superheater means, and
(c) adding said superheated steam into said cylinder chamber during a second volume-increasing stroke in a four-stroke cycle,
- whereby work performed by said superheated steam supplements work performed by said hot combustion gas, and whereby said engine fuel consumption is reduced.

7. The method of claim 1 wherein:
(a) said pressure-control means includes a controllably-variable restriction to the flow of said excess combustion gas, and
(b) said control of operation of said internal-combustion engine includes controlling said controllably-variable restriction,
- whereby pressure of said hot combustion gas is controlled,
- whereby pressure of said cooled combustion gas is controlled,
- whereby the mass of said recycled combustion gas is controlled, and
- whereby said engine can be controllably supercharged.

8. The method of claim 1 wherein:
(a) said gas-cooling means includes a flow of cooling fluid and a means for control of operation of said gas-cooling means by controlling said flow of cooling fluid through said gas-cooling means, and
(b) said control of operation of said gas-cooling means includes controlling said flow of cooling fluid,
- whereby amount of heat taken out from said cooled combustion gas and its temperature is controlled, and
- whereby amount of water vapor condensed in said gas-cooling means can be controlled.

9. The method of claim 1 wherein said source of oxygen includes means for on-site production of oxygen from atmospheric air by separating oxygen from nitrogen.

10. The method of claim 9 wherein said nitrogen is used as cooling fluid in said gas-cooling means.

11. The method of claim 1 wherein some or all of the three fluids, oxygen, fuel and water, are added to said combustion gas before it is received into said cylinder chamber.

12. The method of claim 1 wherein some or all of the three fluids, oxygen, fuel and water, are added to said combustion gas after it is received into said cylinder chamber.

13. The method of claim 1 wherein said engine is a split-cycle engine, said split-cycle engine including at least one compressor cylinder with a compressor chamber within said compressor cylinder and at least one expander cylinder with an expander chamber within said expander cylinder, and wherein said engine cycle further includes the steps of compressing said combustion gas in said compressor chamber and evaporating said water during a volume-decreasing stroke,
- whereby evaporation of said water absorbs heat produced in compression of said combustion gas,
- whereby the temperature of said combustion gas, during said water evaporation, is determined by the temperature of the boiling point of water,
- whereby a near-isothermal compression of said combustion gas takes place during said water evaporation,
- whereby the temperature of said combustion gas, at the end of said volume-decreasing stroke, is lower than it would be if no water was added to said combustion gas,
- whereby it takes less energy to compress said combustion gas, and
- whereby engine compression ratio can be increased.

14. The method of claim 13 further including the steps of providing a water-heating means for heating said water and using heat of said hot combustion gas for heating said water in said water-heating means before said water is added to said cooled combustion gas,
- whereby faster water evaporation is achieved during said volume decreasing stroke in said compressor chamber.

15. The method of claim 1 wherein said engine is a split-cycle engine, said split-cycle engine including at least one compressor cylinder with a compressor chamber within said compressor cylinder and at least one expander cylinder with an expander chamber within said expander cylinder, and wherein said engine cycle further includes the step of adding said water from said collecting means into said expander chamber during a volume-increasing stroke,
- whereby heat of combustion turns said water into high-pressure steam that expands during said volume-increasing stroke and performs work on said piston, whereby work performed by said high-pressure steam supplements work performed by said hot combustion gas, and whereby said engine fuel consumption is reduced.

16. The method of claim 15 further including the steps of providing a water-heating means for heating said water and using heat of said hot combustion gas for heating said water in said water-heating means before said water is added into said expander chamber during said volume-increasing stroke, whereby said water brings more heat into said expander chamber, and whereby said engine fuel consumption is further reduced.

17. The method of claim 1 wherein said engine is a split-cycle engine, said split-cycle engine including at least one compressor cylinder with a compressor chamber within said compressor cylinder and at least one expander cylinder with an expander chamber within said expander cylinder, and wherein said method further includes the steps of:

(a) providing a superheater means for converting said water into a superheated steam, (b) using heat of said hot combustion gas to convert said water into a superheated steam in said superheater means, and (c) adding said superheated steam into said expander chamber during a volume-increasing stroke, whereby work performed by said superheated steam supplements work performed by said hot combustion gas, and whereby said engine fuel consumption is reduced.

18. An internal-combustion engine that uses a mixture of exhaust gas, oxygen and water instead of air for its operation, wherein said mixture is produced by adding oxygen and water to said exhaust gas, and wherein said water was previously produced by condensing water vapor contained in combustion gas exhausted from said engine and separating liquid water from said combustion gas, whereby said engine fuel consumption and harmful exhaust emissions are reduced.

19. The engine of claim 18 wherein said liquid water evaporates during said mixture compression in said engine.

20. The engine of claim 18 wherein heat of said combustion gas is used to convert said liquid water into steam, and wherein said steam is added to gas in said engine during said gas expansion in said engine, whereby work performed by said steam expansion supplements work performed by said gas expansion.

* * * * *